(12) United States Patent
Honjo et al.

(10) Patent No.: US 7,835,635 B2
(45) Date of Patent: Nov. 16, 2010

(54) INTERCHANGEABLE LENS, CAMERA BODY, CAMERA SYSTEM AND METHOD FOR CONTROLLING SAME

(75) Inventors: Kenichi Honjo, Osaka (JP); Makoto Azuma, Ehime (JP)

(73) Assignee: Panasonic Corporation, Osaka (JP)

( * ) Notice: Subject to any disclaimer, the term of this patent is extended or adjusted under 35 U.S.C. 154(b) by 328 days.

(21) Appl. No.: 11/994,044

(22) PCT Filed: Jun. 23, 2006

(86) PCT No.: PCT/JP2006/312604
§ 371 (c)(1),
(2), (4) Date: Dec. 27, 2007

(87) PCT Pub. No.: WO2007/000946
PCT Pub. Date: Jan. 4, 2007

(65) Prior Publication Data
US 2009/0208194 A1   Aug. 20, 2009

(30) Foreign Application Priority Data
Jun. 27, 2005   (JP) .............................. 2005-186584

(51) Int. Cl.
*G03B 17/00* (2006.01)
(52) U.S. Cl. .......................................... 396/55; 396/52
(58) Field of Classification Search ............. 396/52–55; 359/217.3
See application file for complete search history.

(56) References Cited

U.S. PATENT DOCUMENTS 4,733,264 A * 3/1988 Hatase et al. .................. 396/54

(Continued)

FOREIGN PATENT DOCUMENTS

JP   5-224270   9/1993

(Continued)

*Primary Examiner*—W. B. Perkey
*Assistant Examiner*—Warren K Fenwick
(74) *Attorney, Agent, or Firm*—McDermott Will & Emery LLP

(57) ABSTRACT

There is provided an interchangeable lens, a camera body, a camera system, and a method for controlling the same, with which a highly efficient and stable image blur correction effect can be obtained. A camera system 1 has a camera body 10 and an interchangeable lens 20 that can be attached to and detached from the camera body 10. The camera body 10 has an imaging unit for imaging a subject through the interchangeable lens 20, and a sequence microcomputer 100 capable of sending and receiving information to and from a lens microcomputer 200 and for controlling the imaging operation of an imaging unit 120. The interchangeable lens 20 includes a shake detection unit 201 for detecting shake in the camera system 1, an image blur correction device 210 for adjusting the optical path from a subject to the camera body 10 and thereby correcting the blurring of an image caused by shaking of the camera system 1, and the lens microcomputer 200 capable of sending and receiving information to and from the sequence microcomputer 100, and for controlling the drive of the image blur correction device 210 according to the amount of shake detected by the shake detection unit 201. The lens microcomputer 200 actuates the shake correction device 210 once a specific amount of time has elapsed since a command for actuating the image blur correction unit was received from the sequence microcomputer 100.

14 Claims, 15 Drawing Sheets

U.S. PATENT DOCUMENTS

| | | | |
|---|---|---|---|
| 4,796,090 A * | 1/1989 | Fraier | 348/147 |
| 4,869,108 A * | 9/1989 | Washisu | 73/514.19 |
| 5,337,098 A | 8/1994 | Imafuji et al. | |
| 5,623,704 A | 4/1997 | Miyamoto et al. | |
| 5,734,933 A * | 3/1998 | Sekine et al. | 396/55 |
| 5,835,796 A | 11/1998 | Miyamoto et al. | |
| 5,864,722 A | 1/1999 | Aoki et al. | |
| 5,978,600 A * | 11/1999 | Takeuchi et al. | 396/53 |
| 6,154,611 A * | 11/2000 | Washisu | 396/55 |
| 6,704,501 B1 * | 3/2004 | Washisu | 396/55 |
| 6,717,330 B2 * | 4/2004 | Iino et al. | 310/317 |
| 6,751,410 B1 * | 6/2004 | Stavely | 396/55 |
| 7,400,825 B2 * | 7/2008 | Takeuchi et al. | 396/90 |
| 2002/0006278 A1 | 1/2002 | Kitani | |
| 2005/0168586 A1 * | 8/2005 | Tsubusaki | 348/208.99 |
| 2009/0244325 A1 * | 10/2009 | Honjo et al. | 348/231.99 |

FOREIGN PATENT DOCUMENTS

| | | |
|---|---|---|
| JP | 10-232418 | 9/1993 |
| JP | 7-261235 | 10/1995 |
| JP | 7-294984 | 11/1995 |
| JP | 9-80576 | 3/1997 |
| JP | 10-260444 | 9/1998 |
| JP | 11-183955 | 7/1999 |
| JP | 2002-107803 | 4/2002 |
| JP | 2004-348147 | 12/2004 |
| JP | 2005-223431 | 8/2005 |

* cited by examiner

INTERCHANGEABLE LENS, CAMERA BODY, CAMERA SYSTEM AND METHOD FOR CONTROLLING SAME

RELATED APPLICATIONS

This application is the U.S. National Phase under 35 U.S.C. §371 of International Application No. PCT/JP2006/312604, filed on Jun. 23, 2006, which in turn claims the benefit of Japanese Application No. 2005-186584, filed on Jun. 27, 2005, the disclosures of which Applications are incorporated by reference herein.

TECHNICAL FIELD

The present invention relates to a camera system, and more particularly to a camera system equipped with a camera body and an interchangeable lens having an image blur correction function, and to a method for controlling this system.

BACKGROUND ART

Digital imaging devices, typified by digital cameras, have been rapidly growing in popularity in recent years. At the same time, the pixel count has been increasing in the CCDs, CMOSs, and other such imaging elements mounted in digital cameras. This reflects the desire for higher resolution in digital cameras. Therefore, single-reflex camera systems, compact digital cameras, high-magnification digital cameras, and the like have recently been equipped with an image blur correction function for correcting the blurring of images produced by camera shake.

Conventional single-reflex camera systems have had an interchangeable lens with a built-in image blur correction device and shake detection element, such as an angular velocity sensor or acceleration sensor. With these systems, the shake detection element detects when the camera is shaken, the image blur correction device computes a suitable correction value for the shake detected by the shake detection element, and the optical path is corrected by moving an image blur correction lens up, down, left, or right on the basis of this correction value. This suppresses the blurring of an image that would otherwise be produced by camera shake (see, for example, Patent Document 1).

Patent Document 1 proposes a continuous correction mode, in which image blur correction is performed when a release button is pressed half-way down, and a release correction mode, in which image blur correction is performed only during release, in view of reducing power consumption.

Patent Document 1: Japanese Laid-Open Patent Application H05-224270

DISCLOSURE OF INVENTION

Problems to be Solved by the Invention

A conventional image blur correction device is made up of an image blur correction optical system that allows for adjustment of the optical path from a subject to a camera body, and an image blur correction control unit for controlling the operation of the image blur correction optical system. Because the image blur correction optical system can only move within a limited range, during release the correction lens is preferably located near the middle of the movable range.

However, in the continuous correction mode, for example, there is a high likelihood that the correction lens will deviate significantly from the movable range by the time of release. Accordingly, during release when a correction effect is actually needed, there is the risk that the correction width of the image blur correction device will be too small and an adequate image blur correction effect will not be obtained. Also, in this case, since the drive time of the image blur correction device is longer than necessary, more power is consumed, which is inefficient.

Also, with a conventional image blur correction device, the specified image blur correction effect is not obtained immediately upon actuation. More specifically, for a short time after the image blur correction device is actuated, the effects of the control system such as the image blur correction control unit, and the inertial moment of the image blur correction optical system produce a lag in the operation of the image blur correction optical system with respect to the designated correction amount. Consequently, for a while after actuation, the absolute amount of correction error is large, and the specified image blur correction effect is not obtained. As a result, in the release correction mode, the above-mentioned correction error of the image blur correction device prevents the correction effect of the image blur correction device from being obtained for at least part of the time during release.

Thus, the timing at which the image blur correction device is actuated is extremely important from the standpoint of the correction effect, but no camera system has yet been proposed with which the image blur correction device can be actuated at the proper timing.

Furthermore, with a conventional camera system, the user has no way of ascertaining that an image has been captured without the image blur correction device providing an adequate image blur correction effect. Consequently, either the user does not notice that an adequate image blur correction effect has not been obtained, or the user must confirm every time that a satisfactory image has been captured, and either case is undesirable.

It is an object of the present invention to provide an interchangeable lens, a camera body, a camera system, and a method for controlling the same, with which a highly efficient and stable image blur correction effect can be obtained.

It is another object of the present invention to provide a camera body, a camera system, and a method for controlling the same, with which the user can ascertain whether or not an adequate image blur correction effect has been obtained.

Means for Solving Problems

The interchangeable lens according to a first aspect of the present invention makes up of a camera system together with a camera body having a body control unit, and can be attached to and detached from the camera body. This interchangeable lens includes a shake detection unit for detecting shake in the camera system, an image blur correction unit for adjusting the optical path from a subject to the camera body and thereby correcting the blurring of an image caused by shaking of the camera system, and a lens control unit capable of sending and receiving information to and from the body control unit, and for controlling the drive of the image blur correction unit according to the amount of shake detected by the shake detection unit. The lens control unit actuates the image blur correction unit once a specific amount of time has elapsed since the receipt of a command for actuating the image blur correction unit from the body control unit.

With this interchangeable lens, because the lens control unit drives the image blur correction unit once a specific amount of time has elapsed since the receipt of the command for actuating the image blur correction unit from the body control unit, the timing at which the image blur correction unit is actuated can be adjusted so that the correction operation of the image blur correction unit stabilizes simultaneously with, or just prior to, the start of exposure, by adjusting the length of the specific amount of time. As a result, a highly efficient and stable image blur correction effect can be obtained with this interchangeable lens.

The term "command for actuating the image blur correction unit" here refers to a command for the lens control unit on the interchangeable lens side to initiate the actuation sequence of the image blur correction unit.

The interchangeable lens according to a second aspect of the present invention is the interchangeable lens of the first aspect, wherein the body control unit stores body information related to the camera body. The lens control unit stores lens information related to the image blur correction unit. The specific amount of time is determined by the lens control unit on the basis of the body information and lens information.

With this interchangeable lens, because the body information on the camera body side is utilized by the lens control unit to determine the specific amount of time, the timing at which the image blur correction unit is actuated can be adjusted according to the specifications on the camera body side, so camera bodies of different specifications can be accommodated.

The interchangeable lens according to a third aspect of the present invention is the interchangeable lens of the second aspect, wherein the body information includes the exposure preparation time required from the point when the camera body begins exposure preparation until the exposure preparation is completed. The lens information includes the correction stabilization time required from the point when the image blur correction unit is actuated until a specific image blur correction effect is obtained.

In this case, the timing at which the image blur correction unit is actuated is calculated backwards from the exposure preparation time and the correction stabilization time.

The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down. The phrase "a specific image blur correction effect is obtained" here means that the amount of blurring of an image that has been corrected by the image blur correction unit is at or below a predetermined permissible value.

The interchangeable lens according to a fourth aspect of the present invention is the interchangeable lens of the third aspect, wherein the correction stabilization time is shorter than the exposure preparation time.

The interchangeable lens according to a fifth aspect of the present invention is the interchangeable lens of the fourth aspect, wherein the lens control unit has a nonvolatile storage medium for storing the lens information.

The camera body according to a sixth aspect of the present invention makes up of a camera system together with an interchangeable lens that can be attached to and detached from the camera body. The interchangeable lens has a shake detection unit for detecting shake in the camera system, an image blur correction unit for adjusting the optical path from a subject to the camera body and thereby correcting the blurring of an image caused by shaking of the camera system, and a lens control unit for controlling the drive of the image blur correction unit according to the amount of shake detected by the shake detection unit. This camera body includes an imaging unit for imaging a subject through the interchangeable lens, and a body control unit capable of sending and receiving information to and from the lens control unit, and for controlling the imaging action of the imaging unit. The body control unit sends to the lens control unit a command for actuating the image blur correction unit once a specific amount of time has elapsed since the imaging unit has begun exposure preparation.

With this camera body, because the body control unit sends to the lens control unit a command for actuating the image blur correction unit once a specific amount of time has elapsed since the imaging unit has begun exposure preparation, the timing at which the image blur correction unit is actuated can be adjusted so that the correction operation of the image blur correction unit stabilizes simultaneously with, or just prior to, the start of exposure, by adjusting the length of the specific amount of time. As a result, a highly efficient and stable image blur correction effect can be obtained with this camera body.

The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down.

The camera body according to a seventh aspect of the present invention is the camera body of the sixth aspect, wherein the body control unit stores body information related to the camera body. The lens control unit stores lens information related to the image blur correction unit. The specific amount of time is determined by the body control unit on the basis of the body information and lens information.

With this camera body, because the lens information on the interchangeable lens side is utilized by the body control unit to determine the specific amount of time, the timing at which the image blur correction unit is actuated can be adjusted according to the specifications on the interchangeable lens side, so interchangeable lenses of different specifications can be accommodated.

The camera body according to an eighth aspect of the present invention is the camera body of the seventh aspect, wherein the body information includes the exposure preparation time required from the point when the camera body begins exposure preparation until the exposure preparation is completed. The lens information includes the correction stabilization time required from the point when the image blur correction unit is actuated until a specific image blur correction effect is obtained.

In this case, the timing at which the image blur correction unit is actuated is calculated backwards from the exposure preparation time and the correction stabilization time.

The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down. The phrase "a specific image blur correction effect is obtained" here means that the amount of blurring of an image that has been corrected by the image blur correction unit is at or below a predetermined permissible value.

The camera body according to a ninth aspect of the present invention is the camera body of the eighth aspect, wherein the correction stabilization time is shorter than the exposure preparation time.

The camera body according to a tenth aspect of the present invention makes up of a camera system together with an interchangeable lens that can be attached to and detached from the camera body. The interchangeable lens has a shake detection unit for detecting shake in the camera system, an image blur correction unit for adjusting the optical path from a subject to the camera body and thereby correcting the blurring of an image caused by shaking of the camera system, and a lens control unit for controlling the drive of the image blur correction unit according to the amount of shake detected by the shake detection unit. The camera body includes an imaging unit for imaging a subject through the interchangeable lens, and a body control unit capable of sending and receiving information to and from the lens control unit, and for controlling the imaging action of the imaging unit. The body control unit causes the imaging unit to begin exposure once a specific amount of time has elapsed since the completion of exposure preparation in the imaging unit.

With this camera body, because the body control unit causes the imaging unit to begin exposure once a specific amount of time has elapsed since the completion of exposure preparation in the imaging unit, the timing at which the exposure begins can be adjusted so that the exposure is begun simultaneously with, or just after, the stabilization of the correction operation of the image blur correction unit, by adjusting the length of the specific amount of time. As a result, a highly efficient and stable image blur correction effect can be obtained with this camera body.

The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down.

The camera body according to an eleventh aspect of the present invention is the camera body of the tenth aspect, wherein the lens control unit stores lens information that relates to the image blur correction unit and that includes the correction stabilization time required from the point when the image blur correction unit is actuated until a specific image blur correction effect is obtained. The body control unit causes the imaging unit to begin exposure at the point when the time from when the imaging unit started exposure preparation is greater than or equal to the correction stabilization time.

With this camera body, whenever the image blur correction unit is actuated simultaneously with the start of exposure preparation, a correction stabilization time is always ensured as the time from the start of exposure preparation until exposure. As a result, an adequate image blur correction effect can be obtained from the image blur correction unit during exposure, and a highly efficient and stable image blur correction effect can be obtained.

The camera body according to a twelfth aspect of the present invention is the camera body of the eleventh aspect, wherein the lens information includes the detection stabilization time required until the operation of the shake detection unit stabilizes. The body control unit causes the imaging unit to begin exposure at the point when the time since the actuation of the shake detection unit is greater than or equal to the detection stabilization time.

With this camera body, a detection stabilization time is always ensured as the time from the actuation of the shake detection unit until exposure. As a result, an adequate image blur correction effect can be obtained from the image blur correction unit during exposure, and a highly efficient and stable image blur correction effect can be obtained.

The camera body according to a thirteenth aspect of the present invention makes up of a camera system together with an interchangeable lens that can be attached to and detached from the camera body. The interchangeable lens has a shake detection unit for detecting shake in the camera system, an image blur correction unit for adjusting the optical path from a subject to the camera body and thereby correcting the blurring of an image caused by shaking of the camera system, and a lens control unit for controlling the drive of the image blur correction unit according to the amount of shake detected by the shake detection unit. The camera body includes an imaging unit for imaging a subject through the interchangeable lens, and a body control unit capable of sending and receiving information to and from the lens control unit, and for controlling the imaging action of the imaging unit. The body control unit causes the imaging unit to begin exposure once a specific amount of time has elapsed since a command for actuating the image blur correction unit was sent to the lens control unit.

With this camera body, because the body control unit causes the imaging unit to begin exposure preparation once a specific amount of time has elapsed since a command for actuating the image blur correction unit was sent to the lens control unit, the timing at which the exposure begins can be adjusted so that the correction operation of the image blur correction unit stabilizes simultaneously with, or just prior to, the start of exposure, by adjusting the length of the specific amount of time. As a result, a highly efficient and stable image blur correction effect can be obtained with this camera body.

The term "command for actuating the image blur correction unit" here refers to a command for the lens control unit on the interchangeable lens side to initiate the actuation sequence of the image blur correction unit. The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down.

The camera body according to a fourteenth aspect of the present invention is the camera body of the thirteenth aspect, wherein the body control unit stores body information related to the camera body. The lens control unit stores lens information related to the image blur correction unit. The specific amount of time is determined by the body control unit on the basis of the body information and lens information.

With this camera body, because the lens information on the interchangeable lens side is utilized by the body control unit to determine the specific amount of time, the timing at which the image blur correction unit is actuated can be adjusted according to the specifications on the interchangeable lens side, so interchangeable lenses of different specifications can be accommodated.

The camera body according to a fifteenth aspect of the present invention is the camera body of the fourteenth aspect, wherein the lens information includes the correction stabilization time required from the point when the image blur correction unit is actuated until a specific image blur correction effect is obtained.

In this case, the timing at which the image blur correction unit is actuated can be determined from the correction stabilization time.

The phrase "a specific image blur correction effect is obtained" here means that the amount of blurring of an image that has been corrected by the image blur correction unit is at or below a predetermined permissible value.

The camera body according to a sixteenth aspect of the present invention is the camera body of the fifteenth aspect, wherein the body information further includes the exposure preparation time required from the point when the imaging unit begins exposure preparation until the exposure preparation is completed, and the length of the correction stabilization time is greater than or equal to the exposure preparation time.

The camera body according to a seventeenth aspect of the present invention is the camera body of the fifteenth aspect, wherein the body control unit has a nonvolatile storage medium for storing the body information.

The camera body according to an eighteenth aspect of the present invention is the camera body of the thirteenth aspect, further comprising an information display unit for displaying the body information. The body control unit has a first time counting unit for performing a time count from the point when a command for actuating the shake detection unit is sent to the lens control unit until the exposure of the imaging unit is begun, and a warning unit for displaying a warning on the information display unit if the time count in the first time count unit exceeds the exposure preparation time.

This allows the user to ascertain whether or not the operation of the image blur correction unit has stabilized at the point when exposure begins.

The camera body according to a nineteenth aspect of the present invention is the camera body of the thirteenth aspect, further including an information display unit for displaying the body information. The body control unit has a second time counting unit for performing a time count from the point when the command for actuating the image blur correction unit is sent to the lens control unit until the exposure of the imaging unit is begun, and a warning unit for displaying a warning on the information display unit if the time count in the second time count unit exceeds the exposure preparation time.

This allows the user to ascertain whether or not the operation of the image blur correction unit has stabilized at the point when exposure begins.

The camera system according to a twentieth aspect of the present invention is a camera system for imaging a subject, including a camera body and an interchangeable lens that can be attached to and detached from the camera body. The camera body has an imaging unit for imaging the subject, and a body control unit for controlling the imaging action of the imaging unit. The interchangeable lens has a shake detection unit for detecting shake in the camera system, an image blur correction unit for adjusting the optical path from the subject to the camera body and thereby correcting the blurring of an image caused by shaking of the camera system, and a lens control unit for controlling the drive of the image blur correction unit according to the amount of shake detected by the shake detection unit. The body control unit is capable of sending and receiving information to and from the lens control unit. The lens control unit actuates the image blur correction unit once a specific amount of time has elapsed since the receipt of a command for actuating the image blur correction unit from the body control unit.

With this camera system, because the lens control unit drives the image blur correction unit once a specific amount of time has elapsed since the receipt of a command for actuating the image blur correction unit from the body control unit, the timing at which the image blur correction unit is actuated can be adjusted so that the correction operation of the image blur correction unit stabilizes simultaneously with, or just prior to, the start of exposure, by adjusting the length of the specific amount of time. As a result, a highly efficient and stable image blur correction effect can be obtained with this camera system.

The term "command for actuating the image blur correction unit" here refers to a command for the lens control unit on the interchangeable lens side to initiate the actuation sequence of the image blur correction unit.

The camera system according to a twenty-first aspect of the present invention is the camera system of the twentieth aspect, wherein the body control unit stores body information related to the camera body. The lens control unit stores lens information related to the image blur correction unit. The specific amount of time is determined by the lens control unit on the basis of the body information and lens information.

With this camera system, because the lens control unit determines the specific amount of time by utilizing the body information on the camera body side, the timing at which the image blur correction unit is actuated can be adjusted according to the specifications on the camera body side, so camera bodies of different specifications can be accommodated.

The camera system according to a twenty-second aspect of the present invention is the camera body of the twenty-first aspect, wherein the body information includes the exposure preparation time required from the point when the camera body begins exposure preparation until the exposure preparation is completed. The lens information includes the correction stabilization time required from the point when the image blur correction unit is actuated until a specific image blur correction effect is obtained.

In this case, the timing at which the image blur correction unit is actuated is calculated backwards from the exposure preparation time and the correction stabilization time.

The phrase "a specific image blur correction effect is obtained" here means that the amount of blurring of an image that has been corrected by the image blur correction unit is at or below a predetermined permissible value. The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down.

The camera system according to a twenty-third aspect of the present invention is the camera system of the twenty-second aspect, wherein the correction stabilization time is shorter than the exposure preparation time.

The camera system according to a twenty-fourth aspect of the present invention is a camera system for imaging a subject, including a camera body and an interchangeable lens that can be attached to and detached from the camera body. The camera body has an imaging unit for imaging the subject, and a body control unit for controlling the imaging action of the imaging unit. The interchangeable lens has a shake detection unit for detecting shake in the camera system, an image blur correction unit for adjusting the optical path from the subject to the camera body and thereby correcting the blurring of an image caused by shaking of the camera system, and a lens control unit for controlling the drive of the image blur correction unit according to the amount of shake detected by the shake detection unit. The body control unit is capable of sending and receiving information to and from the lens control unit, and sends to the lens control unit a command for actuating the image blur correction unit once a specific amount of time has elapsed since the imaging unit has begun exposure preparation.

With this camera system, the body control unit sends to the lens control unit a command for actuating the image blur correction unit once a specific amount of time has elapsed since the imaging unit has begun exposure preparation. This command causes the lens control unit to actuate the image blur correction unit. Accordingly, the timing at which the image blur correction unit is actuated can be adjusted so that the correction operation of the image blur correction unit stabilizes simultaneously with, or just prior to, the start of exposure, by adjusting the length of the specific amount of time. As a result, a highly efficient and stable image blur correction effect can be obtained with this camera system.

The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down.

The camera system according to a twenty-fifth aspect of the present invention is the camera system of the twenty-fourth aspect, wherein the body control unit stores body information related to the camera body. The lens control unit stores lens information related to the image blur correction unit. The specific amount of time is determined by the body control unit on the basis of the body information and lens information.

With this camera system, because the body control unit determines the specific amount of time by utilizing the lens information on the interchangeable lens side, the timing at which the image blur correction unit is actuated can be adjusted according to the specifications on the interchangeable lens side, so interchangeable lenses of different specifications can be accommodated.

The camera system according to a twenty-sixth aspect of the present invention is the camera system of the twenty-fifth aspect, wherein the body information includes the exposure preparation time required from the point when the camera body begins exposure preparation until the exposure preparation is completed. The lens information includes the correction stabilization time required from the point when the image blur correction unit is actuated until a specific image blur correction effect is obtained.

In this case, the timing at which the image blur correction unit is actuated is calculated backwards from the exposure preparation time and the correction stabilization time.

The phrase "a specific image blur correction effect is obtained" here means that the amount of blurring of an image that has been corrected by the image blur correction unit is at or below a predetermined permissible value.

The camera system according to a twenty-seventh aspect of the present invention is the camera system of the twenty-sixth aspect, wherein the correction stabilization time is shorter than the exposure preparation time.

The camera system according to a twenty-eighth aspect of the present invention is a camera system for imaging a subject, including a camera body and an interchangeable lens that can be attached to and detached from the camera body. The camera body has an imaging unit for imaging the subject, and a body control unit for controlling the imaging action of the imaging unit. The interchangeable lens has a shake detection unit for detecting shake in the camera system, an image blur correction unit for adjusting the optical path from the subject to the camera body and thereby correcting the blurring of an image caused by shaking of the camera system, and a lens control unit for controlling the drive of the image blur correction unit according to the amount of shake detected by the shake detection unit. The body control unit is capable of sending and receiving information to and from the lens control unit, and causes the imaging unit to begin exposure once a specific amount of time has elapsed since the completion of exposure preparation in the imaging unit.

With this camera system, because the body control unit causes the imaging unit to begin exposure once a specific amount of time has elapsed since the completion of exposure preparation in the imaging unit, the timing at which the exposure begins can be adjusted so that the exposure is begun simultaneously with, or just after, the stabilization of the correction operation of the image blur correction unit, by adjusting the length of the specific amount of time. As a result, a highly efficient and stable image blur correction effect can be obtained with this camera system.

The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down.

The camera system according to a twenty-ninth aspect of the present invention is a camera system for imaging a subject, including a camera body and an interchangeable lens that can be attached to and detached from the camera body. The camera body has an imaging unit for imaging the subject, and a body control unit for controlling the imaging action of the imaging unit. The interchangeable lens has a shake detection unit for detecting shake in the camera system, an image blur correction unit for adjusting the optical path from the subject to the camera body and thereby correcting the blurring of an image caused by shaking of the camera system, and a lens control unit for controlling the drive of the image blur correction unit according to the amount of shake detected by the shake detection unit. The body control unit is capable of sending and receiving information to and from the lens control unit, and causes the imaging unit to begin exposure preparation once a specific amount of time has elapsed since a command for actuating the image blur correction unit was sent to the lens control unit.

With this camera system, because the body control unit causes the imaging unit to begin exposure preparation once a specific amount of time has elapsed since a command for actuating the image blur correction unit was sent to the lens control unit, the timing at which the exposure starts can be adjusted so that the correction operation of the image blur correction unit stabilizes simultaneously with, or just prior to, the start of exposure, by adjusting the length of the specific amount of time. As a result, a highly efficient and stable image blur correction effect can be obtained with this camera system.

The term "command for actuating the image blur correction unit" here refers to a command for the lens control unit on the interchangeable lens side to initiate the actuation sequence of the image blur correction unit. The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down.

The camera system according to a thirtieth aspect of the present invention is the camera system of the twenty-ninth aspect, wherein the body control unit stores body information related to the camera body. The lens control unit stores lens information related to the image blur correction unit. The specific amount of time is determined by the body control unit on the basis of the body information and lens information.

With this camera system, because the lens information on the interchangeable lens side is utilized by the body control unit to determine the specific amount of time, the timing at which the image blur correction unit is actuated can be adjusted according to the specifications on the interchangeable lens side, so interchangeable lenses of different specifications can be accommodated.

The camera system according to a thirty-first aspect of the present invention is the camera system of the thirtieth aspect, wherein the lens information includes the correction stabilization time required from the point when the image blur correction unit is actuated until a specific image blur correction effect is obtained.

In this case, the timing at which the image blur correction unit is actuated is determined from the correction stabilization time.

The phrase "a specific image blur correction effect is obtained" here means that the amount of blurring of an image that has been corrected by the image blur correction unit is at or below a predetermined permissible value.

The camera system according to a thirty-second aspect of the present invention is the camera system of the thirty-first aspect, wherein the body information includes the exposure preparation time required from the point when the imaging unit begins exposure preparation until the exposure preparation is completed. The length of the correction stabilization time is greater than or equal to the exposure preparation time.

The control method according to a thirty-third aspect of the present invention is a method for controlling an interchangeable lens that makes up of a camera system together with a camera body having a body control unit, and that can be attached to and detached from the camera body. This control method includes an image blur correction unit actuation step in which a lens control unit actuates an image blur correction unit once a specific amount of time has elapsed since the receipt of a command for actuating the image blur correction unit from the body control unit.

With this control method, because the lens control unit actuates the image blur correction unit once a specific amount of time has elapsed since the receipt of a command for actuating the image blur correction unit from the body control unit, the timing at which the image blur correction unit is actuated can be adjusted so that the correction operation of the image blur correction unit stabilizes is begun simultaneously with, or just prior to, the start of exposure, by adjusting the length of the specific amount of time. As a result, a highly efficient and stable image blur correction effect can be obtained with this control method.

The term "command for actuating the image blur correction unit" here refers to a command for the lens control unit on the interchangeable lens side to initiate the actuation sequence of the image blur correction unit.

The control method according to a thirty-fourth aspect of the present invention is a method for controlling a camera body that makes up of a camera system together with an interchangeable lens that can be attached to and detached from the camera body. The interchangeable lens has a shake detection unit for detecting shake in the camera system, an image blur correction unit for adjusting the optical path from a subject to the camera body and thereby correcting the blurring of an image caused by shaking of the camera system, and a lens control unit for controlling the drive of the image blur correction unit according to the amount of shake detected by the shake detection unit. This control method includes an exposure preparation step in which the imaging unit prepares for exposure, an actuation command step in which the body control unit sends to the lens control unit a command for actuating the image blur correction unit once a specific amount of time has elapsed since the imaging unit began the exposure preparation, and an exposure step in which the imaging unit begins exposure once the exposure preparation has been completed in the imaging unit.

With this control method, the body control unit sends to the lens control unit a command for actuating the image blur correction unit once a specific amount of time has elapsed since the imaging unit began exposure preparation. This command causes the lens control unit to actuate the image blur correction unit. Accordingly, the timing at which the image blur correction unit is actuated can be adjusted so that the correction operation of the image blur correction unit stabilizes simultaneously with, or just prior to, the start of exposure, by adjusting the length of the specific amount of time. As a result, a highly efficient and stable image blur correction effect can be obtained with this control method.

The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down.

The control method according to a thirty-fifth aspect of the present invention is a method for controlling a camera body that makes up of a camera system together with an interchangeable lens that can be attached to and detached from the camera body. The interchangeable lens has a shake detection unit for detecting shake in the camera system, an image blur correction unit for adjusting the optical path from a subject to the camera body and thereby correcting the blurring of an image caused by shaking of the camera system, and a lens control unit for controlling the drive of the image blur correction unit according to the amount of shake detected by the shake detection unit. This control method includes an exposure preparation step in which the imaging unit prepares for exposure, an actuation command step in which the body control unit sends to the lens control unit a command for actuating the image blur correction unit at substantially the same time that the imaging unit begins the exposure preparation, and an exposure step in which the imaging unit begins exposure once a specific amount of time has elapsed since the imaging unit completed the exposure preparation of.

With this control method, because the body control unit causes the imaging unit to begin exposure once a specific amount of time has elapsed since the completion of exposure preparation of the imaging unit, the timing at which the exposure begins can be adjusted so that the exposure is begun simultaneously with, or just after, the stabilization of the correction operation of the image blur correction unit, by adjusting the length of the specific amount of time. As a result, a highly efficient and stable image blur correction effect can be obtained with this control method.

The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down. The phrase "substantially simultaneously" includes not only a case of being completely simultaneous, but also a case in which the actions are not completely simultaneous due to a time lag produced by the sending and receiving of signals.

The control method according to a thirty-sixth aspect of the present invention is a method for controlling a camera body that makes up of a camera system together with an interchangeable lens that can be attached to and detached from the camera body. The interchangeable lens has a shake detection unit for detecting shake in the camera system, an image blur correction unit for adjusting the optical path from a subject to the camera body and thereby correcting the blurring of an image caused by shaking of the camera system, and a lens control unit for controlling the drive of the image blur correction unit according to the amount of shake detected by the shake detection unit. This control method includes an actuation command step in which the body control unit sends to the lens control unit a command for actuating the image blur correction unit, an exposure preparation step in which the imaging unit begins exposure preparation once a specific amount of time has elapsed since the command for actuating the image blur correction unit was sent, and an exposure step in which the imaging unit begins exposure once the exposure preparation has been completed in the imaging unit.

With this control method, because the imaging unit begins exposure preparation once a specific amount of time has elapsed since the command for actuating the image blur correction unit was sent to the lens control unit, the timing at which the exposure begins can be adjusted so that the exposure is begun simultaneously with, or just after, the stabilization of the correction operation of the image blur correction unit, by adjusting the length of the specific amount of time. As a result, a highly efficient and stable image blur correction effect can be obtained with this control method.

The term "command for actuating the image blur correction unit" here refers to a command for the lens control unit on the interchangeable lens side to initiate the actuation sequence of the image blur correction unit. The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down.

The control method according to a thirty-seventh aspect of the present invention is a method for controlling a camera system including a camera body having a body control unit for controlling the imaging action of an imaging unit, and an interchangeable lens that can be attached to and detached from the camera body and has a lens control unit capable of sending and receiving information to and from the body control unit, and for controlling the drive of an image blur correction unit according to the shake detected by a shake detection unit. This control method includes an exposure preparation step in which the imaging unit prepares for exposure, an actuation command step in which the body control unit sends to the lens control unit a command for actuating the image blur correction unit at substantially the same time that the imaging unit begins exposure preparation, an image blur correction unit actuation step in which the lens control unit actuates the image blur correction unit once a specific amount of time has elapsed since the command for actuating the image blur correction unit was received by the lens control unit, and an exposure step in which the imaging unit begins exposure once the exposure preparation has been completed in the imaging unit.

With this control method, because the lens control unit drives the image blur correction unit once a specific amount of time has elapsed since the receipt of the command for actuating the image blur correction unit from the body control unit, the timing at which the image blur correction unit is actuated can be adjusted so that the correction operation of the image blur correction unit stabilizes simultaneously with, or just prior to, the start of exposure, by adjusting the length of the specific amount of time. As a result, a highly efficient and stable image blur correction effect can be obtained with this camera system.

The term "command for actuating the image blur correction unit" here refers to a command for the lens control unit on the interchangeable lens side to initiate the actuation sequence of the image blur correction unit. The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down. The phrase "substantially simultaneously" includes not only a case of being completely simultaneous, but also a case in which the actions are not completely simultaneous due to a time lag produced by the sending and receiving of signals.

The control method according to a thirty-eighth aspect of the present invention is a method for controlling a camera system including a camera body having a body control unit for controlling the imaging action of an imaging unit, and an interchangeable lens that can be attached to and detached from the camera body and has a lens control unit capable of sending and receiving information to and from the body control unit, and for controlling the drive of an image blur correction unit according to the shake detected by a shake detection unit. This control method includes an exposure preparation step in which the imaging unit prepares for exposure, an actuation command step in which the body control unit sends to the lens control unit a command for actuating the image blur correction unit once a specific amount of time has elapsed since the imaging unit began the exposure preparation, an image blur correction unit actuation step in which the lens control unit actuates the image blur correction unit at substantially the same time that the lens control unit receives the command for actuating the image blur correction unit, and an exposure step in which the imaging unit begins exposure once the exposure preparation has been completed in the imaging unit.

With this control method, the body control unit sends to the lens control unit an image blur correction unit drive command for driving the image blur correction unit once a specific amount of time has elapsed since the imaging unit began exposure preparation. This command causes the lens control unit to actuate the image blur correction unit. Accordingly, the timing at which the image blur correction unit is actuated can be adjusted so that the correction operation of the image blur correction unit stabilizes simultaneously with, or just prior to, the start of exposure, by adjusting the length of the specific amount of time. As a result, a highly efficient and stable image blur correction effect can be obtained with this control method.

The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down. The phrase "substantially simultaneously" includes not only a case of being completely simultaneous, but also a case in which the actions are not completely simultaneous due to a time lag produced by the sending and receiving of signals.

The control method according to a thirty-ninth aspect of the present invention is a method for controlling a camera system including a camera body having a body control unit for controlling the imaging action of an imaging unit, and an interchangeable lens that can be attached to and detached from the camera body and has a lens control unit capable of sending and receiving information to and from the body control unit, and for controlling the drive of an image blur correction unit according to the shake detected by a shake detection unit. This control method includes an exposure preparation step in which the imaging unit prepares for exposure, an actuation command step in which the body control unit sends to the lens control unit a command for actuating the image blur correction unit at substantially the same time that the imaging unit begins the exposure preparation, an image blur correction unit actuation step in which the lens control unit actuates the image blur correction unit at substantially the same time that the lens control unit receives the command for actuating the image blur correction unit, and an exposure step in which the imaging unit begins exposure once a specific amount of time has elapsed since the imaging unit completed the exposure preparation.

With this control method, because the body control unit causes the imaging unit to begin exposure once a specific amount of time has elapsed since the completion of exposure preparation in the imaging unit, the timing at which the exposure begins can be adjusted so that the exposure is begun simultaneously with, or just after, the stabilization of the correction operation of the image blur correction unit, by adjusting the length of the specific amount of time. As a result, a highly efficient and stable image blur correction effect can be obtained with this control method.

The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down. The phrase "substantially simultaneously" includes not only a case of being completely simultaneous, but also a case in which the actions are not completely simultaneous due to a time lag produced by the sending and receiving of signals.

The control method according to a fortieth aspect of the present invention is a method for controlling a camera system including a camera body having a body control unit for controlling the imaging action of an imaging unit, and an interchangeable lens that can be attached to and detached from the camera body and has a lens control unit capable of sending and receiving information to and from the body control unit, and for controlling the drive of an image blur correction unit according to the shake detected by a shake detection unit. This control method includes an exposure preparation step in which the imaging unit prepares for exposure, an actuation command step in which the body control unit sends to the lens control unit a command for actuating the image blur correction unit, an image blur correction unit actuation step in which the lens control unit actuates the image blur correction unit at substantially the same time that the lens control unit receives the command for actuating the image blur correction unit, and an exposure step in which the imaging unit begins exposure once a specific amount of time has elapsed since the body control unit sent the command for actuating the image blur correction unit.

With this control method, because the body control unit causes the imaging unit to begin exposure once a specific amount of time has elapsed since the command for actuating the image blur correction unit was sent to the lens control unit, the timing at which the exposure begins can be adjusted so that the exposure is begun simultaneously with, or just after, the stabilization of the correction operation of the image blur correction unit, by adjusting the length of the specific amount of time. As a result, a highly efficient and stable image blur correction effect can be obtained with this control method.

The term "command for actuating the image blur correction unit" here refers to a command for the lens control unit on the interchangeable lens side to initiate the actuation sequence of the image blur correction unit. The term "exposure preparation" here means a series of operations transitioning from a state in which a subject can be confirmed to a state in which exposure can be performed. In the case of a single-reflex camera system, for instance, an example of this is a return mirror up operation after a release button has been pressed all the way down. The phrase "substantially simultaneously" includes not only a case of being completely simultaneous, but also a case in which the actions are not completely simultaneous due to a time lag produced by the sending and receiving of signals.

The interchangeable lens according to a forty-first aspect of the present invention makes up of a camera system together with a camera body having a body control unit, and can be attached to and detached from the camera body. This interchangeable lens includes a shake detection unit for detecting shake in the camera system, an image blur correction unit for adjusting the optical path from a subject to the camera body and thereby correcting the blurring of an image caused by shaking of the camera system, and a lens control unit capable of sending and receiving information to and from the body control unit, and for controlling the drive of the image blur correction unit according to the amount of shake detected by the shake detection unit. The lens control unit uses body information related to the camera body and held in the body control unit to determine the timing at which the image blur correction unit is actuated.

With this interchangeable lens, because the lens control unit uses body information on the camera body side to determine the timing at which the image blur correction unit is actuated, the timing at which the image blur correction unit is actuated can be adjusted according to the specifications on the camera body side. This allows the start of exposure by the camera body to be substantially simultaneous with the timing at which the operation of the image blur correction unit stabilizes, and allows a highly efficient and stable image blur correction effect to be obtained.

The camera body according to a forty-second aspect of the present invention makes up of a camera system together with an interchangeable lens that can be attached to and detached from the camera body. The interchangeable lens has a shake detection unit for detecting shake in the camera system, an image blur correction unit for adjusting the optical path from a subject to the camera body and thereby correcting the blurring of an image caused by shaking of the camera system, and a lens control unit for controlling the drive of the image blur correction unit according to the amount of shake detected by the shake detection unit. This camera body includes an imaging unit for imaging a subject through the interchangeable lens, and a body control unit capable of sending and receiving information to and from the lens control unit, and for controlling the imaging action of the imaging unit. The body control unit uses lens information related to the interchangeable lens and held in the lens control unit to determine the timing at which the image blur correction unit is actuated.

With this camera body, because the body control unit uses the lens information on the interchangeable lens side to determine the timing at which the image blur correction unit is actuated, the timing at which the image blur correction unit is actuated can be adjusted according to the specifications on the interchangeable lens side, and a highly efficient and stable image blur correction effect can be obtained.

The camera body according to a forty-third aspect of the present invention makes up of a camera system together with an interchangeable lens that can be attached to and detached from the camera body. The interchangeable lens has a shake detection unit for detecting shake in the camera system, an image blur correction unit for adjusting the optical path from a subject to the camera body and thereby correcting the blurring of an image caused by shaking of the camera system, and a lens control unit for controlling the drive of the image blur correction unit according to the amount of shake detected by the shake detection unit. This camera body includes an imaging unit for imaging a subject through the interchangeable lens, and a body control unit capable of sending and receiving information to and from the lens control unit, and for controlling the imaging action of the imaging unit. The body control unit uses lens information related to the interchangeable lens and held in the lens control unit to determine the timing at which exposure begins in the imaging unit or the timing at which exposure preparation begins.

With this camera body, because the body control unit uses lens information on the interchangeable lens side to determine the timing at which exposure begins in the imaging unit, or the timing at which exposure preparation begins, the timing at which exposure begins can be adjusted according to the specifications of the image blur correction unit on the interchangeable lens side. As a result, exposure can begin substantially simultaneously with, or just after, the stabilization of the operation of the image blur correction unit, and a highly efficient and stable image blur correction effect can be obtained.

Effect of the Invention

Because the camera body, interchangeable lens, camera system, and control method therefor according to the present invention have the constitution described above, a highly efficient and stable image blur correction effect can be obtained.

Also, because the camera body, interchangeable lens, camera system, and control method therefor according to the present invention have the constitution described above, a user can ascertain whether or not an adequate image blur correction effect has been obtained.

Figure 1:
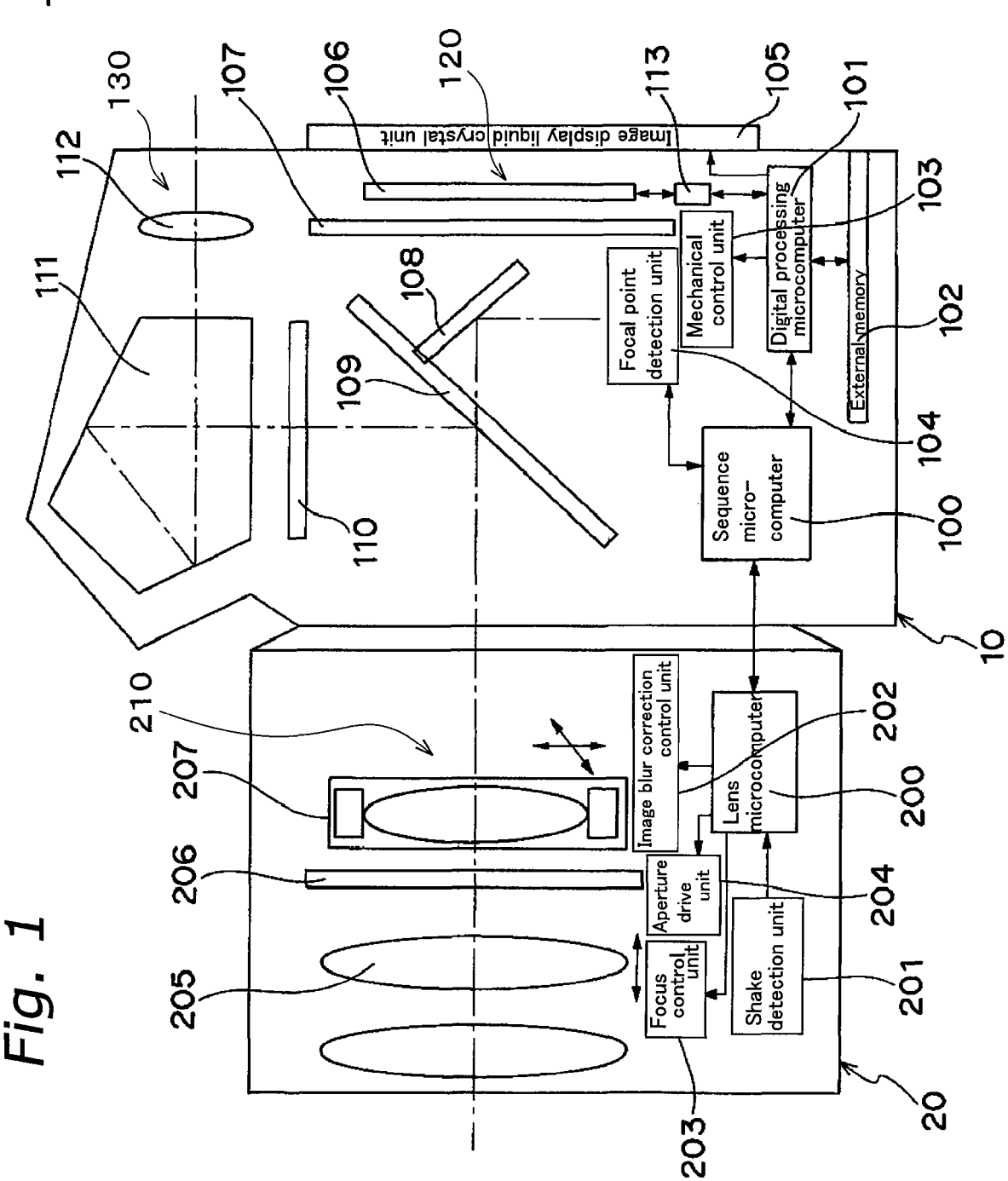
FIG. 1 is a diagram of the overall structure of a single-reflex camera system in a first embodiment of the present invention.

EXPLANATION OF REFERENCE 1 camera system
10 camera body
20 interchangeable lens
100 sequence microcomputer (body control unit)
101 digital processing microcomputer
102 external memory
103 mechanical control unit
104 focal point detection unit
105 liquid crystal unit for image display
106 imaging sensor
107 shutter
108 sub-mirror
109 main mirror
110 reticle
111 pentaprism
112 eyepiece
113 imaging sensor drive unit
120 imaging unit
130 finder unit
200 lens microcomputer (lens control unit)
201 shake detection unit
202 image blur correction control unit
203 focus control unit
204 aperture drive unit
205 focusing lens
206 aperture unit
207 image blur correction lens unit
210 image blur correction device (image blur correction unit)
S1 first switch
S2 second switch
SMODE image blur correction mode selector switch

BEST MODE FOR CARRYING OUT THE INVENTION

Embodiments of the present invention will now be described with reference to the appended drawings.

First Embodiment

1. Overall Structure of Camera System

The overall structure of a single-reflex camera system 1 according to a first embodiment of the present invention will be described with reference to FIGS. 1 to 3. FIG. 1 is a diagram of the overall structure of the single-reflex camera system 1 as the camera system according to the first embodiment of the present invention, FIG. 2 is a block diagram of the single-reflex camera system 1 shown in FIG. 1, and FIG. 3 is an oblique view of an interchangeable lens.

Figure 2:
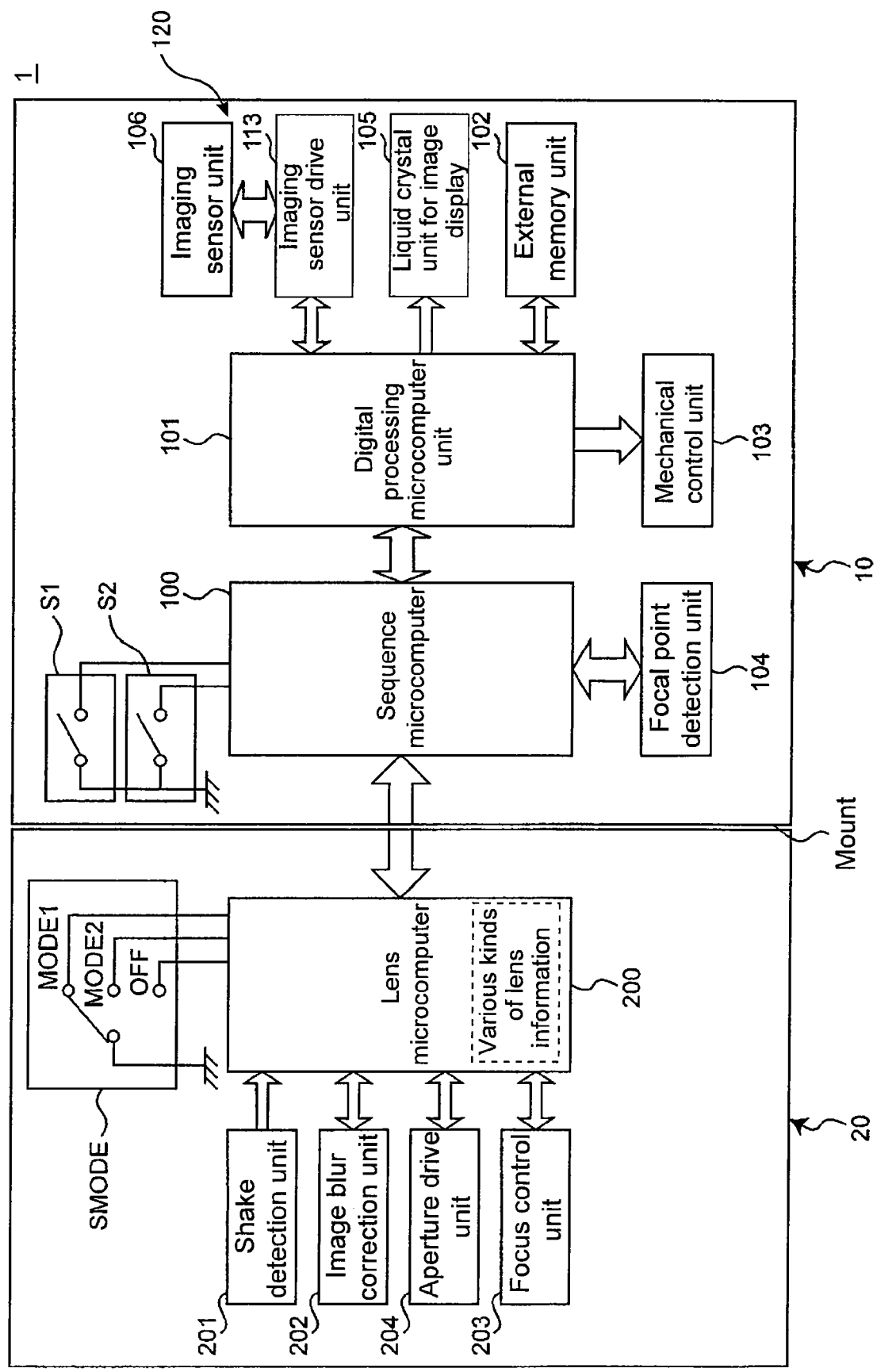
FIG. 2 is a block diagram of a camera unit and an interchangeable lens in the first embodiment of the present invention.
Figure 3:
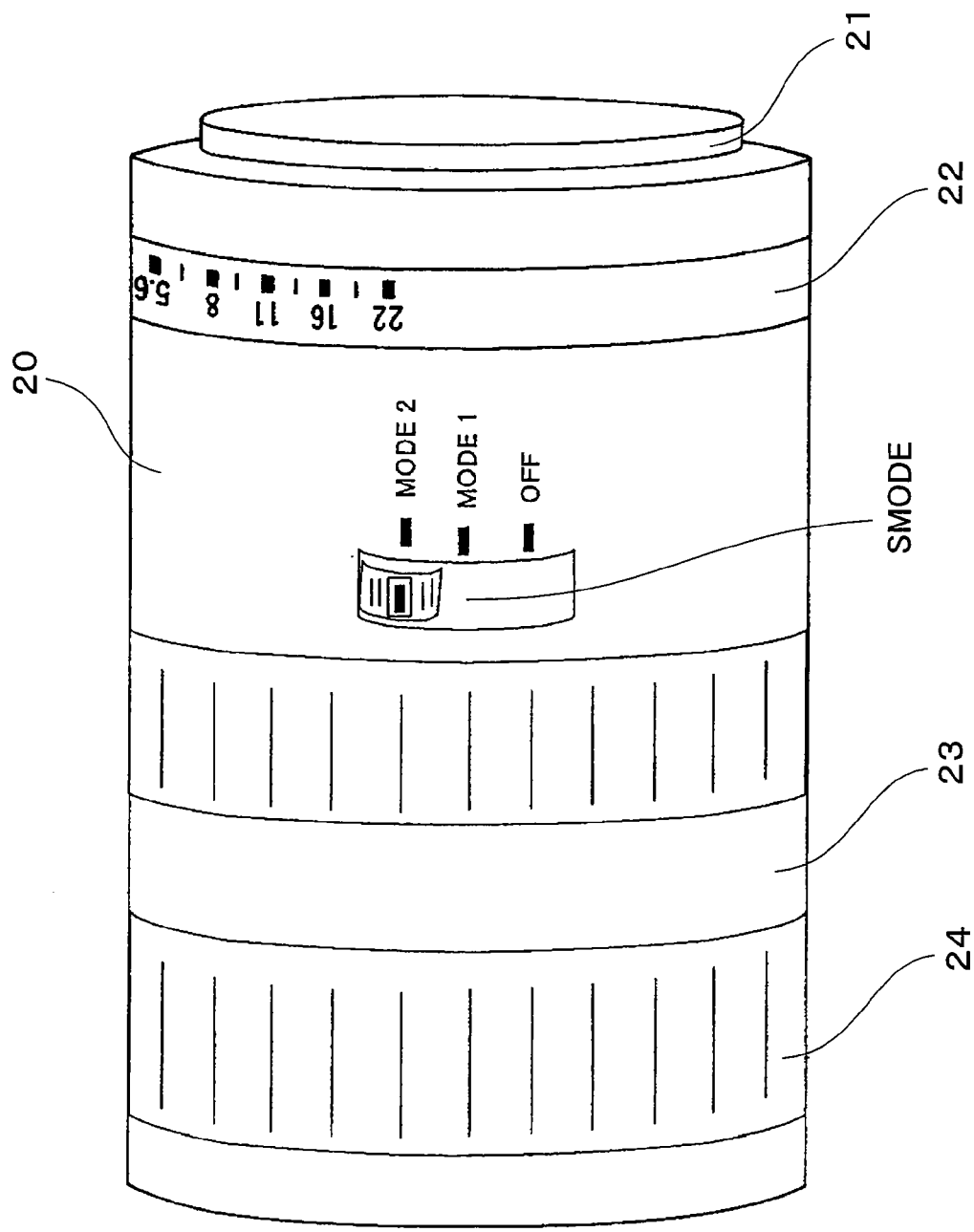
FIG. 3 is an oblique view of the interchangeable lens in the first embodiment of the present invention.

As shown in FIGS. 1 and 2, the single-reflex camera system 1 is mainly made up of a camera body 10 having the main functions of the camera system 1, and an interchangeable lens 20 that can be attached to and detached from the camera body 10.

1.1. Camera Body

The camera body 10 is mainly made up of an imaging unit 120 for imaging a subject, a sequence microcomputer 100 serving as a body control unit for controlling the operation of the imaging unit 120, an image display liquid crystal unit 105 serving as an information display unit for displaying captured images and various kinds of information, an external memory 102 serving as an interface with a medium for recording image data, and a finder unit 130 for viewing a subject image.

The imaging unit 120 is mainly made up of a main mirror 109 capable of reflecting and transmitting incident light, a sub-mirror 108 for reflecting light transmitted by the main mirror 109, an imaging sensor 106 such as a CCD for performing opto-electrical conversion, a shutter 107 for adjusting the exposure state of the imaging sensor 106, a mechanical control unit 103 for controlling the drive of the sub-mirror 108, the main mirror 109, and the shutter 107, an imaging sensor drive unit 113 for driving the imaging sensor 106, a digital processing microcomputer 101 for controlling the operation of the various components of the imaging unit 120, and a focal point detection unit 104 for detecting a focal point (focused on a subject image). The focal point detection unit 104 performs focal point detection by a standard phase difference detection method, for example.

The digital processing microcomputer 101 is connected to the external memory 102, the image display liquid crystal unit 105, the mechanical control unit 103, and the imaging sensor drive unit 113, and controls the operations of the various components. The sequence microcomputer 100 is connected to the digital processing microcomputer 101 and the focal point detection unit 104, and controls the operation of the digital processing microcomputer 101 and the focal point detection unit 104. The sequence microcomputer 100 has a body information storage unit (not shown) that stores various kinds of information (body information) related to the camera body 10.

The finder unit 130 is made up of a reticle 110 on which a subject image is formed, a pentaprism 111 for converting the subject image into an erecting image, and an eyepiece 112 through which the user views an erecting image of the subject.

Also, as shown in FIG. 2, the camera body 10 is provided with a release button (not shown), a first switch S1 that is connected to the release button and operates when the release button is pressed half-way down, and a second switch S2 that is connected to the release button and operates when the release button is pressed all the way down. That is, the first switch S1 is ON when the release button has been pressed half-way down, and the first switch S1 and second switch S2 are both ON when the release button has been pressed all the way down. When the release button is pressed half-way down and the first switch S1 is ON, power is supplied to the various components, starting with the sequence microcomputer 100, the digital processing microcomputer 101, and a lens microcomputer 200.

1.2. Interchangeable Lens

The interchangeable lens 20 is mainly made up of a focusing lens 205, a focus control unit 203 for controlling the operation of the focusing lens 205, an aperture unit 206, an aperture drive unit 204 for controlling the operation of the aperture unit 206, a shake detection unit 201 for detecting the amount of shake in the camera system 1, an image blur correction device 210 serving as an image blur correction unit for correcting the blurring of an image produced by shaking of the camera system 1, and the lens microcomputer 200 serving as a lens control unit for controlling the operation of various components. The lens microcomputer 200 also has a lens information storage unit (not shown) for storing various kinds of lens information (described below). The image blur correction device 210 is made up of an image blur correction lens unit 207 capable of adjusting the optical path, and an image blur correction control unit 202 for controlling the operation of the image blur correction lens unit 207. The lens information storage unit is preferably a nonvolatile recording medium. The lens information storage unit may also be mounted outside of the lens microcomputer 200.

As shown in FIG. 3, the interchangeable lens 20 has a lens mount 21 installed on the camera body 10 side, an aperture setting ring 22 for manually setting the aperture, an image blur correction mode selector switch SMODE for switching the image blur correction mode, a focusing ring 23 for focusing manually, and a zoom ring 24 for setting the zoom manually.

When the interchangeable lens 20 has been mounted on the camera body 10, the sequence microcomputer 100 and the lens microcomputer 200 are connected via electrical contacts on mounts (not shown) on the lens mount 21 and the camera body 10 side. This allows information to be sent back and forth between the lens microcomputer 200 and the sequence microcomputer 100.

Also, as shown in FIG. 3, the image blur correction mode selector switch SMODE is made up of a three-position sliding selector switch. Here, "MODE 1" is a "continuous correction mode" in which image blur correction is performed when the release button is pressed half-way down, while "MODE 2" is a "release correction mode," in which image blur correction is performed only during release ("during release" means that the release button is pressed all the way down), and "OFF" is a mode in which image blur correction is not performed. The user selects one of these modes by using the image blur correction mode selector switch SMODE.

2. Operation of Camera System

The operation of the camera system 1 will be described with reference to FIGS. 1 to 8.

2.1. Operation Before Imaging

As shown in FIG. 1, the light from a subject (not shown) is transmitted through the interchangeable lens 20 and is incident on the main mirror 109, which is a semi-transmitting mirror. Part of the light incident on the main mirror 109 is reflected and is incident on the reticle 110, and the rest of the light is transmitted and incident on the sub-mirror 108. The light incident on the reticle 110 forms a subject image. This subject image is converted by the pentaprism 111 into an erecting image and is incident on the eyepiece 112. This allows the user to see an erecting image of the subject through the pentaprism 111 and the eyepiece 112. Meanwhile, the light incident on the sub-mirror 108 is reflected and is incident on the focal point detection unit 104.

2.2. Operation During Imaging

When the release button is pressed half-way down by the user, the first switch S1 enters its ON state. As a result, power is supplied to the sequence microcomputer 100 and the lens microcomputer 200, and the sequence microcomputer 100 and lens microcomputer 200 are actuated. The sequence microcomputer 100 and lens microcomputer 200 are programmed to exchange information with each other upon actuation. For example, body information related to the camera body 10 is sent from the sequence microcomputer 100 to the lens microcomputer 200, and this body information is held in the lens microcomputer 200. Also, lens information related to the interchangeable lens 20 is sent from the lens microcomputer 200 to the sequence microcomputer 100, and this lens information is held in the sequence microcomputer 100. The sequence microcomputer 100 examines the received lens information. If the sequence microcomputer 100 determines that the interchangeable lens 20 is equipped with an image blur correction function, then the sequence microcomputer 100 sends to the lens microcomputer 200 a command to operate the shake detection unit 201 and a command to operate the image blur correction control unit 202.

A case in which MODE 1 is selected with the image blur correction mode selector switch SMODE will be described here as an example. When MODE 1 is selected with the image blur correction mode selector switch SMODE, a defocus amount (hereinafter "Df amount") from the focal point detection unit 104 is outputted from the sequence microcomputer 100, and the sequence microcomputer 100 sends the lens microcomputer 200 a command to drive the focusing lens 205 by the Df amount. Upon receiving the command, the lens microcomputer 200 controls the focus control unit 203 to drive the focusing lens 205 by the Df amount. The detected Df amount is steadily decreased by repeatedly detecting the focal point and driving the focusing lens 205. The sequence microcomputer 100 determines that a focused state has been attained at the point when the detected Df amount is at or below a specific level, and sends the lens microcomputer 200 a command to halt the drive of the focusing lens 205.

After a focused state has been attained, the sequence microcomputer 100 stands by until the second switch S2 changes to its ON state. As mentioned above, the second switch S2 is a switch that enters its ON state when the release button has been pressed all the way down. When the second switch S2 enters its ON state, the sequence microcomputer 100 sends the lens microcomputer 200 an aperture value calculated on the basis of the output from a photometric sensor (not shown) included in the camera system 1. After receiving the aperture value, the lens microcomputer 200 closes (or opens) the aperture unit 206 via the aperture drive unit 204 until the received aperture value matches the aperture value of the aperture unit 206. The sequence microcomputer 100 sends the digital processing microcomputer 101 a command to initiate the release sequence simultaneously with the indication of the aperture value.

After receiving a command to initiate the release sequence, the digital processing microcomputer 101 first uses the mechanical control unit 103 to retract the sub-mirror 108 and the main mirror 109 from within the optical path. Once this retraction is complete, the digital processing microcomputer 101 sends the imaging sensor drive unit 113 a command to drive the imaging sensor 106, and then sends the mechanical control unit 103 a command to operate the shutter 107. The mechanical control unit 103 exposes the imaging sensor 106 for the length of time indicated by the shutter speed, which is calculated on the basis of the output from the photometric sensor (not shown). Exposure may also be executed by sending a command to the imaging sensor drive unit 113 such that the imaging sensor 106 will carry out a charge accumulation time that matches the time indicated by the shutter speed.

Upon completion of exposure, the digital processing microcomputer 101 reads image data from the imaging sensor 106 via the imaging sensor drive unit 113, and after specific image processing, controls the image display liquid crystal unit 105 such that the captured image is displayed, and writes image data to a storage medium via the external memory 102.

Also, the digital processing microcomputer 101 notifies the sequence microcomputer 100 of the completion of exposure and commands the mechanical control unit 103 to reset the plurality of mirrors 108 and 109 and the shutter 107 to their initial positions at the same time.

The sequence microcomputer 100 commands the lens microcomputer 200 to return the lens position of the image blur correction lens unit 207 to a reference position (center), and to reset the aperture of the aperture unit 206 to an open position, and the lens microcomputer 200 sends a reset command to the image blur correction control unit 202 and the aperture drive unit 204.

Upon completion of resetting, the lens microcomputer 200 notifies the sequence microcomputer 100 that resetting has been completed. The sequence microcomputer 100 waits for reset completion information from the lens microcomputer 200 and completion information for the series of processing after exposure by the digital processing microcomputer 101. Once both sets of information have been received, the sequence microcomputer 100 confirms that the release button has not been pressed, that is, that the first switch S1 and the second switch S2 are both in their OFF state. If the first switch S1 and the second switch S2 are both in their OFF state, the imaging sequence is ended.

3. Imaging Control with Priority Given to Release Timing (when the Interchangeable Lens Side Determines the Timing at which the Image Blur Correction Device is Actuated)

3.1. Time Chart

Figure 4:
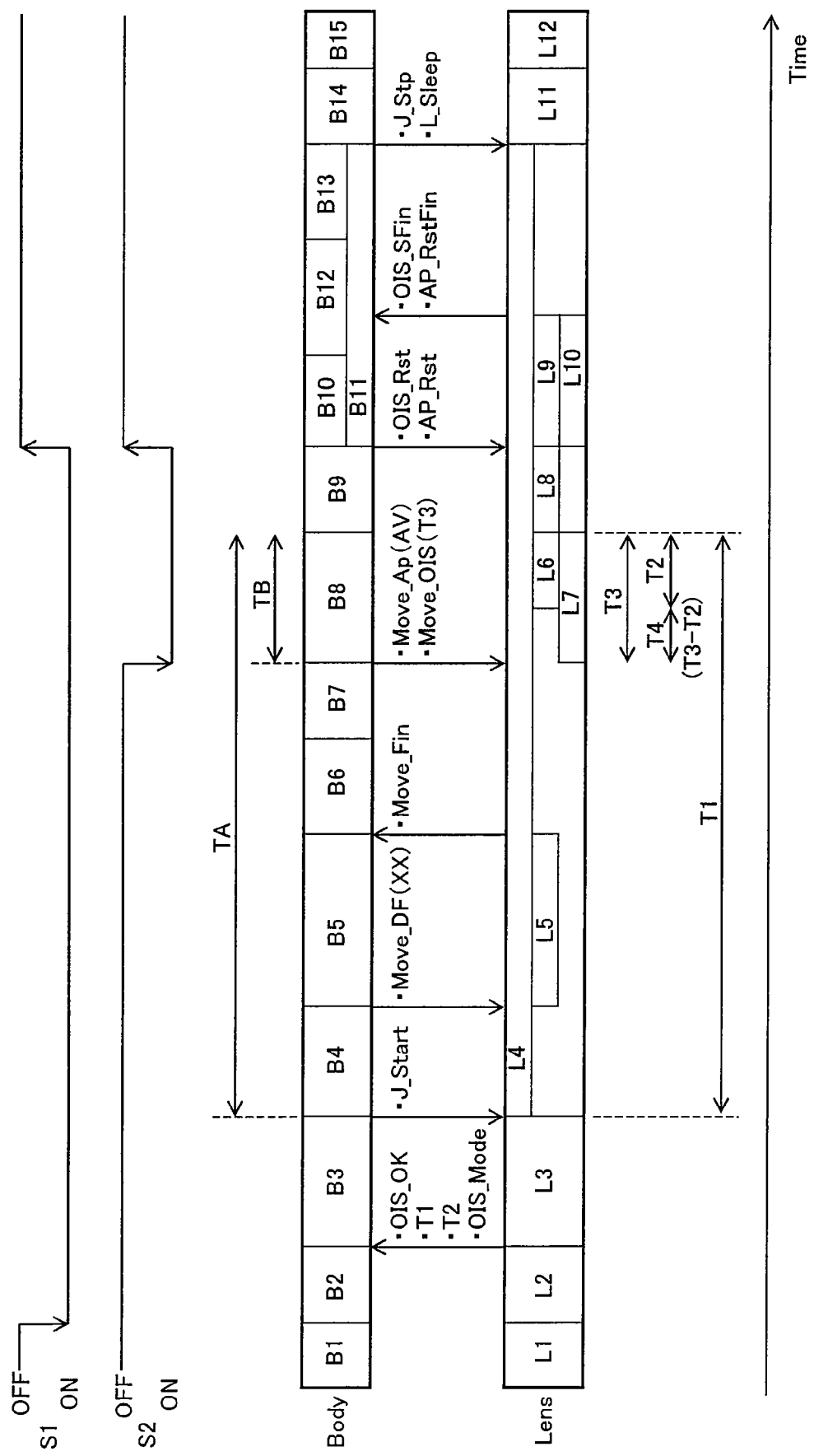
FIG. 4 is a time chart A (a type in which release timing has priority) in the first embodiment of the present invention.
Figure 5B:
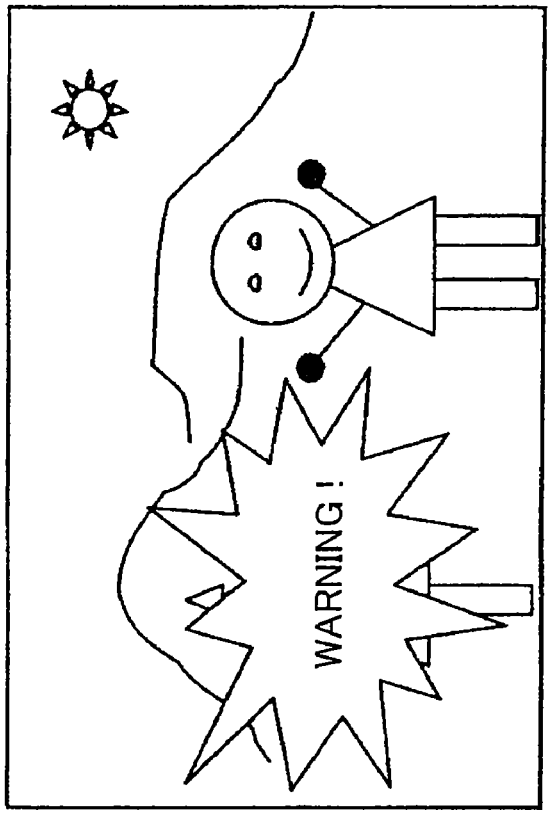
FIG. 5a is an example of a normal display, and FIG. 5b a shake warning display, in an image display in the first embodiment of the present invention.
Figure 5A:
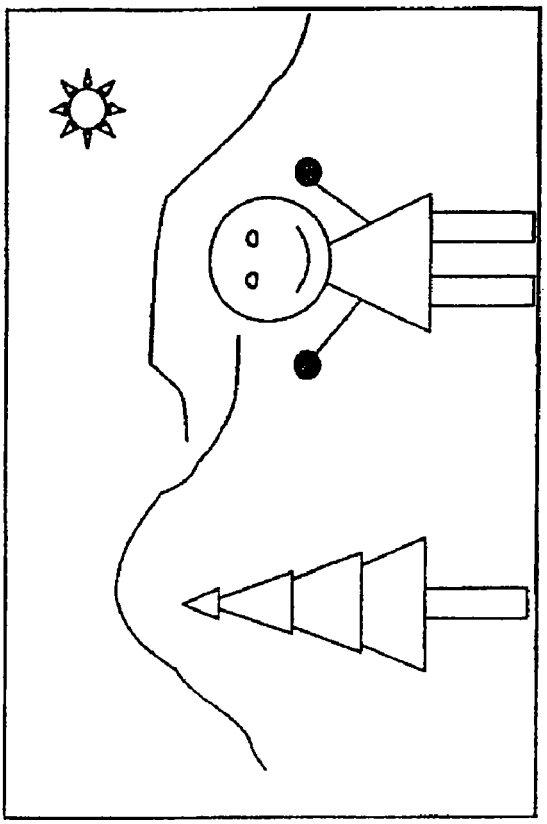
Figure 6:
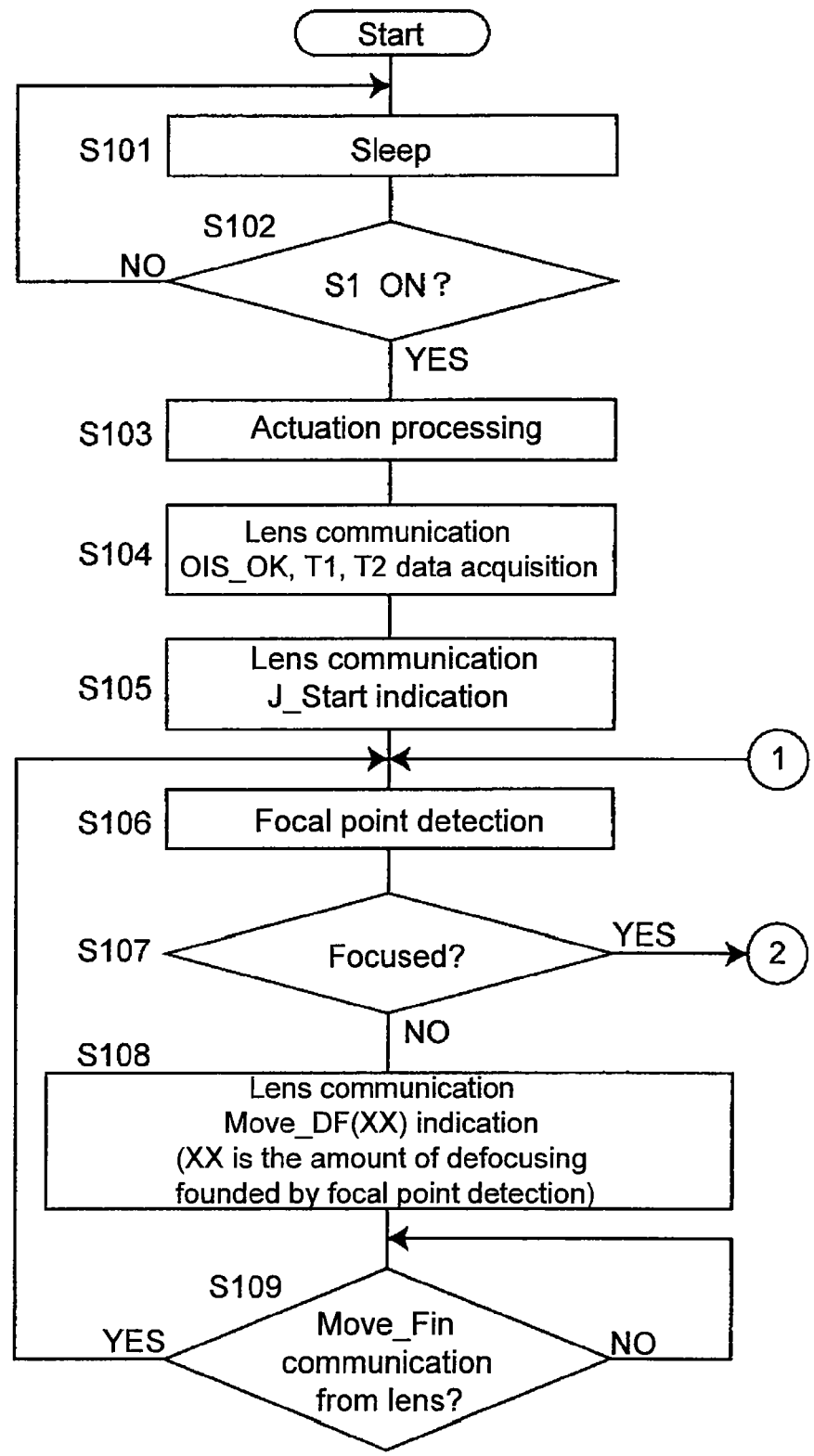
FIG. 6 is a flowchart of the time chart A in the first embodiment of the present invention.
Figure 7:
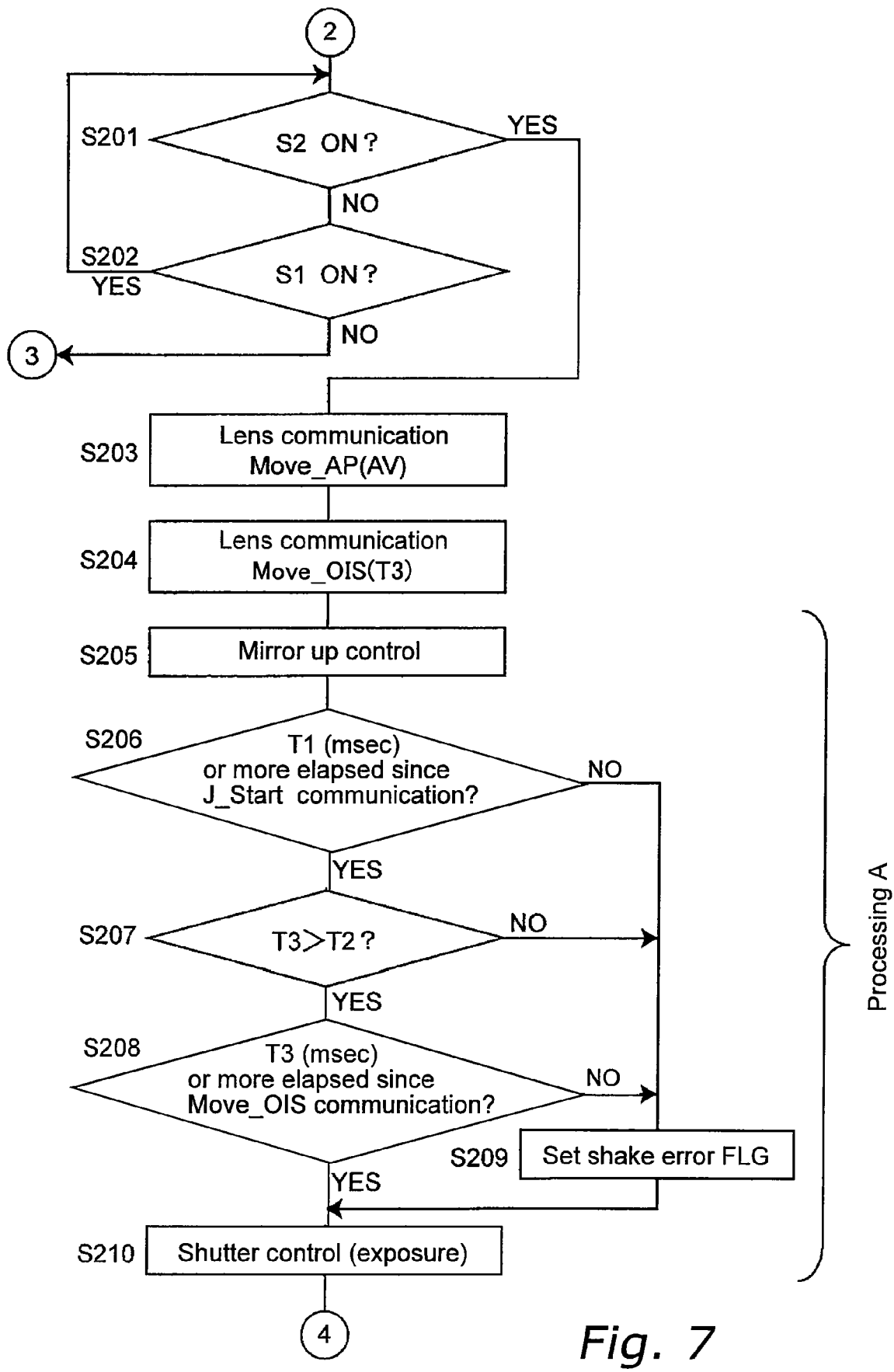
FIG. 7 is a flowchart of the time chart A in the first embodiment of the present invention.
Figure 8:
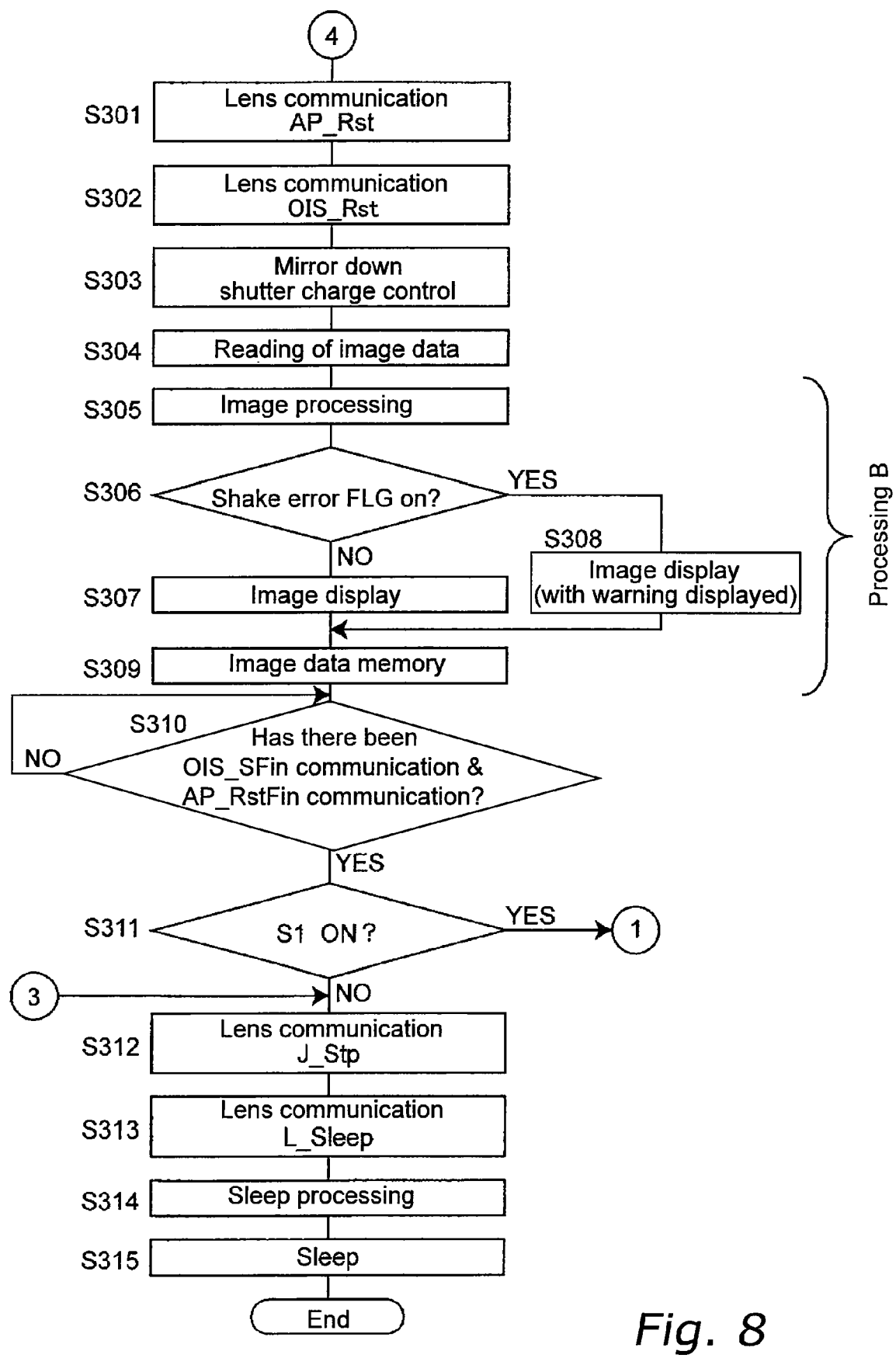
FIG. 8 is a flowchart of the time chart A in the first embodiment of the present invention.

Next, the communication details between the interchangeable lens 20 and the camera body 10, and the timing thereof, will be described with reference to FIGS. 4 to 7. FIG. 4 is a time chart A (a time chart of an imaging sequence of a type in which release timing has priority) as a first time chart applicable in an embodiment of the present invention. Table 1 gives a list of the data, commands, and communications used in the information transfer performed by the camera body 10 and the interchangeable lens 20 in relation to the image blur correction of the interchangeable lens 20 in this embodiment. FIGS. 6 to 8 are flowcharts of the time chart A. The time chart shown in FIG. 4 assumes a state in which MODE 2 (image blur correction is performed only during release) has been selected as the image blur correction mode. The phrase "release timing has priority" means that there is no time lag caused by waiting for exposure to begin together with other operations.

Actuation

When the release button is in its OFF state, the camera body 10 and the interchangeable lens 20 are in sleep states B1 and L1 (FIG. 4). The sequence microcomputer 100 and the lens microcomputer 200 wait in their sleep states for the first switch S1 to enter its ON state (steps S101 and S102 in FIG. 6). When the release button is pressed half-way down and the first switch S1 enters its ON state (Yes in step S102 in FIG. 6), the camera body 10 and the interchangeable lens 20 both undergo actuation processing B2 and L2 (step S103 in FIG. 6), and then the various kinds of information shown below are sent from the lens microcomputer 200 of the interchangeable lens 20 to the sequence microcomputer 100 of the camera body 10 (communications B3 and L3 in FIG. 4, and step S104 in FIG. 6).

"OIS_OK": Data indicating that an image blur correction function has been installed in the interchangeable lens 20

"T1": Information (detection stabilization time) related to the time it takes from the actuation of a shake detection sensor included in the shake detection unit 201 until the operation stabilizes "T2": Information (correction stabilization time, excitation drive time for image blur correction) related to the time it takes from the actuation of the image blur correction control unit 202 until image blur correction operation stabilizes "OIS_MODE": Information indicating the image blur correction mode (here, information indicating that MODE 2 has been selected)

Of T1 and T2, the one with the larger value is information related to the time it takes from the actuation of the image blur correction device 210 until the operation stabilizes, that is, the image blur correction stabilization time.

Next, a command "J_Start" instructing the operation of the shake detection sensor is sent from the sequence microcomputer 100 to the lens microcomputer 200. Upon receiving the J_Start command, the lens microcomputer 200 operates the shake detection unit 201 (shake detection unit operation L4). The sequence microcomputer 100 starts a first time count ("TA" in FIG. 4) substantially simultaneously with the J_Start command of the previous stage.

microcomputer 100 determines whether or not the detected Df amount is within the focal range (step S107 in FIG. 6), and if the Df amount is over a specific permissible value (outside the focal range) (No in step S107 in FIG. 6), a focus drive command "Move_DF (XX)" is sent from the sequence microcomputer 100 to the lens microcomputer 200 on the basis of the calculated Df amount (step S108 in FIG. 6). Here, "XX" is a variable indicating the Df amount. Upon receiving this command, the lens microcomputer 200 sends the focus control unit 203 a command to drive the focusing lens 205 by the Df amount, and on the basis of this command the focus control unit 203 drives the focusing lens 205 by the Df amount (focus lens drive L5, state of waiting to halt focus lens drive B5).

Once the drive of the focusing lens 205 is complete, "Move_Fin" information is sent from the lens microcomputer 200 to the sequence microcomputer 100, and the sequence microcomputer 100 is notified of the completion of the drive of the focusing lens 205 (step S109 in FIG. 6). Once this communication is confirmed (Yes in step S109 in FIG. 6), the focal point detection operation is repeated (step S106 in FIG. 6). More specifically, after the sequence microcomputer 100 confirms the completion of lens drive, focal point detection

TABLE 1

Data transmitted between camera body 10 and interchangeable lens 20

| Data name | Transmission direction Interchangeable lens: L Camera body: B | Description of information included in data |
| --- | --- | --- |
| OIS_OK | L → B | Flag (FLG) indicating that lens has image blur correction function |
| T1 | L → B | Time until stabilization of shake detection sensor included in shake detection unit |
| T2 | L → B | Time required from drive of image blur correction until stabilization (time required for excitation drive for image blur correction) |
| OIS_Mode | L → B | Data indicating type of image blur correction mode (mode in which correction is performed constantly, or mode in which correction is performed only during release) |

Commands and communication transmitted between camera body 10 and interchangeable lens 20

| Name | Transmission direction | Description of information included in command or communication |
| --- | --- | --- |
| J_Start | B → L | Command to start shake detection |
| Move_DF (XX) | B → L | Command to displace focus lens by defocus amount XX (mm) |
| Move_Fin | L → B | Communication indicating completion of displacement of focus lens by instructed defocus amount XX |
| Move_AP (AV) | B → L | Command to drive aperture unit 206 so that aperture value will be AV |
| Move_OIS (T3) | B → L | Command to perform stable image blur correction drive T3 msec after receipt of command. If (T3) is omitted, image blur correction drive is performed right away. |
| OIS_Rst | B → L | Command to drive image blur correction lens unit 207 to reference position (center) |
| AP_Rst | B → L | Command to drive aperture unit 206 to release position |
| OIS_Sfin | L → B | Communication indicating that image blur correction lens unit 207 has returned to reference position (center), and reset completed |
| AP_RstFin | L → B | Communication indicating that drive to aperture to release position has been completed |
| J_Stp | B → L | Command to stop shake detection |
| L_Sleep | B → L | Command to put circuit included in interchangeable lens 20 in power conservation mode |

Focusing

In the camera body 10, focal point detection B4 for focusing is performed and the Df amount is acquired by the focal point detection unit 104 (step S106 in FIG. 6). The sequence B6 is performed again by the focal point detection unit 104, and a new Df amount is acquired (step S106 in FIG. 6). If the newly acquired Df amount is at or below a specific permissible value, it is determined to be within the focal range (focus F; Yes in step S107 in FIG. 6).

Exposure Preparation Operation

After this, the sequence microcomputer 100 confirms that the release button has been pressed all the way down, that is, the state of the second switch S2 (standby state B7; step S201 in FIG. 7). If the second switch S2 is in its OFF state (No in step S201 in FIG. 7), the sequence microcomputer 100 confirms the state of the first switch S1 (step S202 in FIG. 7). If the first switch S1 is in its OFF state (No in step S202 in FIG. 7), the sequence microcomputer 100 sends the lens microcomputer 200 a command to stop shake detection "J_Stp" (step S312 in FIG. 8), and a sleep state is entered (step S313). Also, the sequence microcomputer 100 performs sleep processing on the camera body 10 (step S314), and the camera body 10 enters its sleep state (step S315). This corresponds to a case in which the user stops pressing the release button, and is because there is the possibility that the imaging operation has been canceled.

Once the second switch S2 enters its ON state in step S201 in FIG. 7, simultaneously with this an aperture drive command "Move_Ap (AV)" (a command to drive the aperture unit 206 so that the aperture value will be AV) and an image blur correction drive command "Move_OIS (T3)" (a command to perform stabilized image blur correction drive for T3 (msec) after the receipt of the command) are sent from the sequence microcomputer 100 to the lens microcomputer 200 (steps S203 and S204 in FIG. 7). In other words, the time T3 indicates the time interval from the start of exposure preparation until the start of exposure, and is one of the elements that determine the timing at which the image blur correction device 210 is actuated.

Also, a second time count is started ("TB" in FIG. 4) in the sequence microcomputer 100 simultaneously with the output of the Move_OIS (T3) command. After this, a mirror up operation B8 is executed in the camera body 10 (step S205 in FIG. 7). More specifically, the main mirror 109 and the sub-mirror 108 are housed on the reticle 110 side by the mechanical control unit 103.

Meanwhile, upon receiving the Move_Ap (AV) command, the lens microcomputer 200 sends a command to the aperture drive unit 204 such that the aperture value will be AV, and the aperture unit 206 is subjected to control L7. The aperture drive unit 204 and the aperture unit 206 are designed so as to complete an update of the aperture value within a time shorter than the time it takes for mirror-up to be performed in the camera body 10. Also, if T3>T2, the lens microcomputer 200 performs the computation of T4=T3−T2 upon receiving the Move_OIS (T3) command (exposure preparation command). After waiting for an excitation preparation time T4 (T3−T2) after the receipt of Move_OIS (T3), an actuation command is send from the lens microcomputer 200 to the image blur correction device 210. As a result, the image blur correction control unit 202 and the image blur correction lens unit 207 are actuated (excitation drive for image blur correction L6). If T3≦T2, that is, if T4≦0, then the image blur correction device 210 is actuated simultaneously with the receipt of the image blur correction drive command "Move_OIS (T3)." If T4=0 at this point, the image blur correction operation will stabilize simultaneously with the start of exposure, but if T4<0, the timing at which the image blur correction operation stabilizes will be delayed from the start of exposure by the time (T2−T3).

Timing at which Image Blur Correction Device is Actuated

Figure 14A:
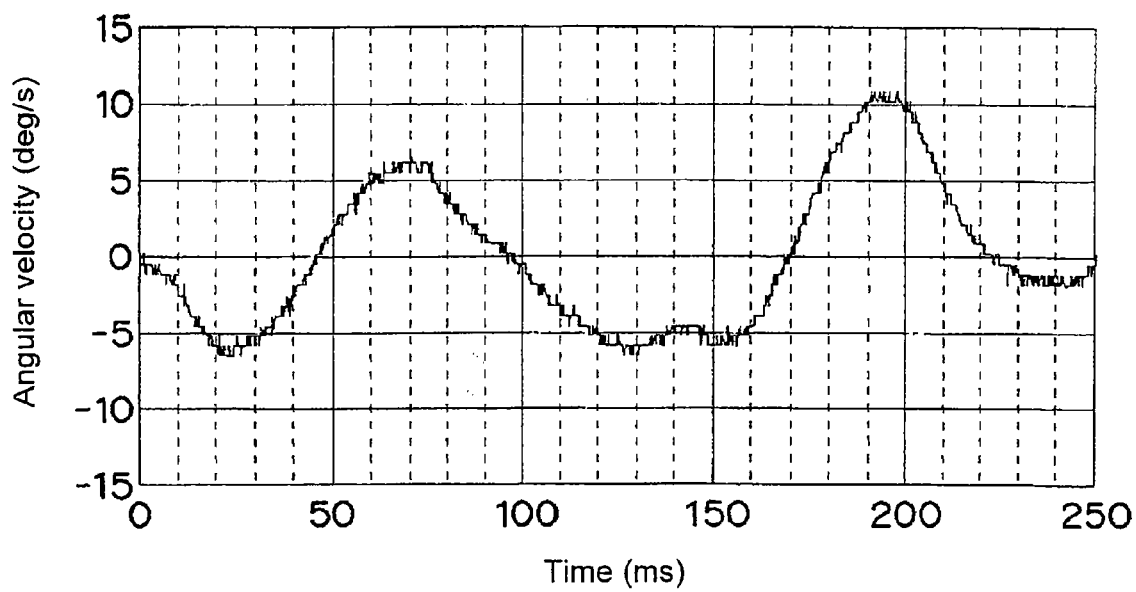
FIG. 14a is a graph of the results of an experiment to detect shaking of a camera system caused by shaking of the hands.

The reason for driving the image blur correction device 210 after first waiting the excitation preparation time T4 will now be described with reference to FIG. 14. FIG. 14a is a graph illustrating data from an experiment to detect hand shake by a gyro sensor, and FIG. 14a is a graph illustrating the operation of the image blur correction device 210 in an embodiment of the present invention (and particularly its operation from its actuation until the operation stabilizes).

Figure 14B:
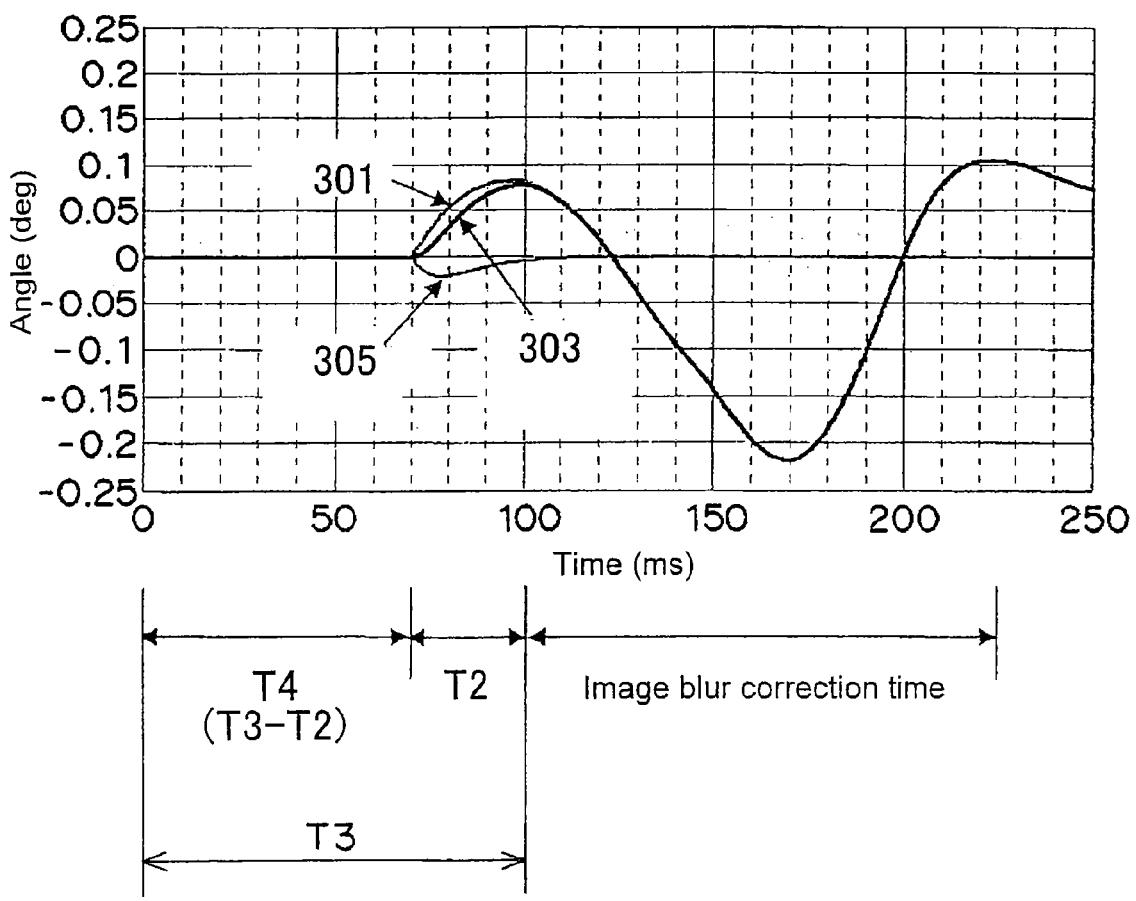
FIG. 14b is a graph of the change over time in the correction error and the amount of shake correction performed by an image blur correction device in an embodiment of the present invention.

The graph in FIG. 14b shows the various speeds detected by a gyro sensor (not shown) serving as the shake detection means attached to the camera body 10, or a gyro sensor included in the shake detection unit 201 of the interchangeable lens 20 in a state in which actually the camera shakes. This graph is a reference diagram provided as a typical example of an actual shake profile during imaging.

The graph in FIG. 14b was obtained by integrating the shake detected by the shake detection unit 201 of the lens microcomputer 200 in actual imaging (such as the shake shown in FIG. 14a) from the beginning of the excitation drive time T2 for image blur correction. Also, the graph in FIG. 14b shows a plot 301 of the correction amount (angle) of the image blur correction command send from the lens microcomputer 200 to the image blur correction control unit 202, a plot 303 of the correction amount (angle) actually performed when the image blur correction lens unit 207 was driven according to this command, and a plot 305 of the correction error (angle) (the difference between the plot 301 of the command correction amount and the plot 303 of the actual correction amount). Here, the time zero on the graph is the point when the second switch S2 becomes ON. Also, the correction angle serving as the correction amount refers to the angle of the optical axis corrected by operation of the image blur correction lens unit 207.

As shown in FIG. 14b, during the excitation drive time T2 for image blur correction after the start of the correction operation, the correction amount 303 of the image blur correction lens unit 207 produces a lag due to the effect of the control system, such as the image blur correction control unit 202, or the inertial moment of the image blur correction lens unit 207, with respect to the command correction amount 301. Consequently, for a while after the start of drive of the image blur correction lens unit 207 (the excitation drive time T2 for image blur correction: a period of about 30 msec in FIG. 14b), the absolute amount of the correction error 305 becomes larger than in the subsequent period, and there is the possibility that the image blur correction lens unit 207 and the image blur correction control unit 202 will not have an adequate image blur correction effect. Therefore, to obtain a stable image blur correction effect, the excitation drive time T2 for image blur correction must be ensured from the point of actuation of the image blur correction control unit 202 and the image blur correction lens unit 207.

With this camera system 1, however, the settings are such that the image blur correction lens unit 207 starts its correction operation after an excitation preparation time T4 (T3−T2) has elapsed since the start of exposure preparation in the camera body 10. This excitation preparation time T4 is determined by the lens microcomputer 200 from the exposure preparation time T3 included in the body information held in the sequence microcomputer 100, and the excitation drive time T2 for image blur correction included in the lens information held in the lens microcomputer 200. More specifically, the excitation preparation time T4 is the waiting time of the image blur correction control unit 202 and the image blur correction lens unit 207, and is found by subtracting the excitation drive time T2 for image blur correction from the exposure preparation time T3. Accordingly, with this camera system 1, after the excitation drive time T2 for image blur correction there is a transition to an image blur correction period (from the time of 100 msec and afterward in FIG. 14b) in which accurate image blur correction is performed substantially simultaneously with the start of exposure. As shown in FIG. 14b, accurate and stable image blur correction is possible during this period because the correction error 305 is sufficiently small (image blur correction L8).

Thus, with this camera system 1, the timing at which the image blur correction device 210 is actuated is determined by calculating backwards from the exposure preparation time T3 and the excitation drive time T2 for image blur correction. This allows the image blur correction operation to be stabilized along with the start of exposure, affords a highly efficient and stable image blur correction effect, and makes it possible to minimize the negative effect of the image blur correction optical system on image quality and so forth.

Furthermore, during the excitation drive time T2 for image blur correction, for example, the image blur correction lens unit 207 is micro-vibrated to improve conformity during start-up of the main image blur correction. As a result, stable image blur correction drive is performed from the point when the time T2 has elapsed since the start of drive of the image blur correction unit and thereafter.

Exposure Operation

The sequence microcomputer 100 of the camera body 10, at the point of mirror-up completion, confirms that the time TA (the time obtained by the above-mentioned first time count) since the communication J_Start was sent to the interchangeable lens 20 is longer than the time T1 until the shake detection sensor of the shake detection unit 201 stabilizes, and that the time TB (the time obtained by the above-mentioned second time count) since the command Move_OIS (T3) was sent to the interchangeable lens 20 is longer than the time T3 indicated at the start of image blur correction. That is, it is confirmed that TA>T1 and TB>T3 (steps S206 and S208 in FIG. 7). If either of these should be shorter, an image blur correction error flag is set up (step S209 in FIG. 7). If an image blur correction error flag has been set up, a warning display is preferably performed during the subsequent after-view display.

Next, upon completion of the mirror up operation B8, that is, after the exposure preparation time T3 has elapsed since the start of the mirror up operation B8, the shutter 107 is driven by the mechanical control unit 103, and the imaging sensor 106 is exposed for a time corresponding to the shutter speed (exposure operation B9, step S210 in FIG. 7).

Resetting Operation

Upon completion of exposure, a command "AP_Rst" to drive the aperture unit 206 and reset it to its open position, and a command "OIS_Rst" to reset the image blur correction lens unit 207 to its reference position (center) are sent from the sequence microcomputer 100 to the lens microcomputer 200 (steps S301 and S302 in FIG. 8). As a result, the aperture unit 206 and the image blur correction lens unit 207 are driven to be reset in the interchangeable lens 20 (precentering L9, aperture opening drive L10). Upon completion of reset drive, the lens microcomputer 200 sends communications "OIS_SFin" and "AP_RstFin" indicating that completion to the sequence microcomputer 100.

After the exposure is finished, mirror down control and resetting of the shutter to its initial position (shutter charging) are performed in the camera body 10 (mirror down and shutter charging B11, step S303 in FIG. 8). At the same time, image data is read by the imaging sensor drive unit 113 from the imaging sensor 106 (image data read-out B10, step S304 in FIG. 8), and the data that has been read is subjected by the digital processing microcomputer 101 to specific image processing B12 (step S305 in FIG. 8). The captured image that has undergone this processing is displayed by the image display liquid crystal unit 105 on the back of the camera, and held in the external memory 102 (image display and data memory B13)

Warning Operation

In the display of the captured image on the image display liquid crystal unit 105, the status of the image blur correction error flag is checked by the sequence microcomputer 100 (step S306 in FIG. 8). If the error flag is not set up, just the captured image is displayed (step S307 in FIG. 8). On the other hand, if the image blur correction unit error flag is set up (if it is ON), a command is sent from the sequence microcomputer 100 to the digital processing microcomputer 101 to display the image with an attached warning (Yes in step S306 in FIG. 8). As a result, as shown in FIG. 5b, a captured image with an attached warning is displayed on the image display liquid crystal unit 105 (step S308 in FIG. 8). After the display of the captured image, the image data is held in the external memory 102 (step S309 in FIG. 8).

Also, when "OIS_SFin" and "AP_RstFin" have been sent from the lens microcomputer 200, if the first switch S1 is in its ON state (Yes in step S311 in FIG. 8), then focal point detection is started again (step S106 in FIG. 6).

Sleep

Upon completion of the series of processing in the camera body 10 and of the resetting of the aperture and image blur correction in the interchangeable lens 20, if the first switch S1 is in its OFF state (No in step S311 in FIG. 8), then the sequence microcomputer 100 sends the lens microcomputer 200 a command to stop shake detection "J_Stp" (step S312 in FIG. 8), and the lens microcomputer 200 performs sleep processing L11 on the interchangeable lens 20 (S314 in FIG. 8). Also, the sequence microcomputer 100 performs sleep processing B14 on the camera body 10 (step S314 in FIG. 8). As a result, the camera body 10 and the interchangeable lens 20 enter their sleep state B15 and L12 (step S315 in FIG. 8).

The term "sleep" here means that the various constituent components, including the microcomputer components, are in a power conservation mode. If the first switch S1 is in its ON state, the above-mentioned sequence is repeated from focal point detection (issuance of the J_Start command) (step S102 in FIG. 6).

Second Embodiment

Figure 9:
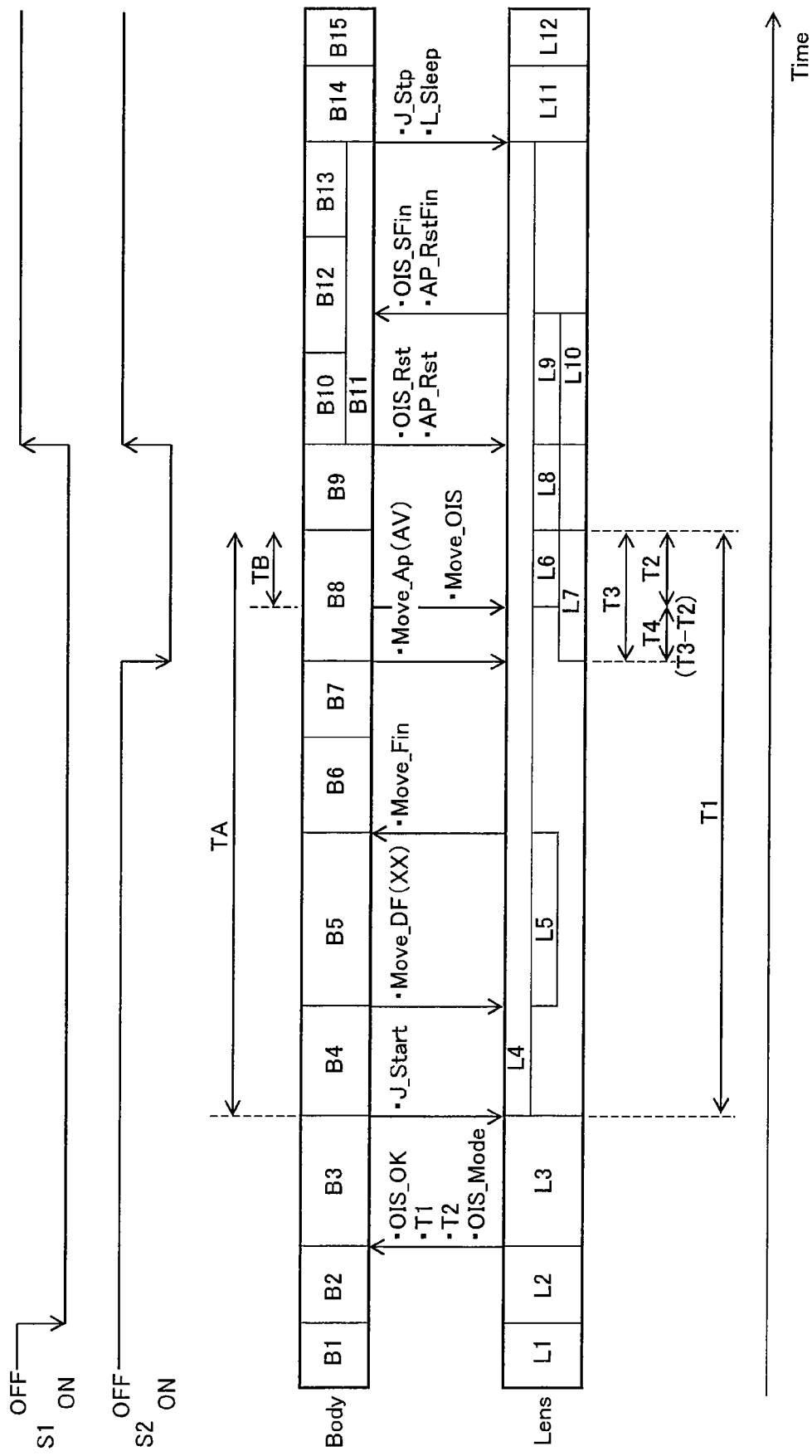
FIG. 9 is a time chart B in a second embodiment of the present invention.

In the above embodiment, the interchangeable lens 20 side determined the timing at which the image blur correction device 210 was actuated, but this may instead be determined on the camera body 10 side. The imaging sequence of a camera system according to a second embodiment of the present invention will be described with reference to FIG. 9. FIG. 9 is a time chart B, which is time chart of the imaging sequence according to the second embodiment of the present invention.

Imaging Control in which Release Timing has Priority (when the Camera Body Side Determines the Timing at which the Image Blur Correction Device is Actuated)

This time chart B differs from the sequence shown in time chart A (see FIG. 4) in that the timing at which the image blur correction device is actuated is determined on the camera body 10 side, and the lens microcomputer 200 on the interchangeable lens 20 side actuates the image blur correction device simultaneously with the receipt of an image blur correction actuation command "Move_OIS" from the sequence microcomputer 100 on the camera body 10 side. The camera body 10 sends a command to the interchangeable lens 20 side to begin image blur correction with a Move_OIS communication so that image blur correction will be performed immediately, before the time T2 of the timing at which exposure is scheduled to begin after mirror-up. At this point, the camera body 10 calculates backwards from the exposure preparation time T3 and the excitation drive time T2 for image blur correction to determine the timing at which the actuation command "Move_OIS" will be sent. That is, the time T4 is calculated, and after the time T4 has elapsed since the start of exposure preparation, the actuation command "Move_OIS" is sent through the lens microcomputer 200 to the image blur correction control unit 202. If T3≦T2, that is, if T4≦0, then the actuation command "Move_OIS" is sent from the sequence microcomputer 100 to the lens microcomputer 200 simultaneously with the start of exposure preparation. If T4=0 at this point, the image blur correction operation will stabilize simultaneously with the start of exposure, but if T4<0, the timing at which the image blur correction operation stabilizes will be delayed from the start of exposure by the time (T2−T3).

As shown in FIG. 9, the sequence microcomputer 100 confirms that the time interval TB (the time obtained by the above-mentioned second time count) from the Move_OIS communication until the start of exposure is longer than the time T2. Similarly, at the point when mirror-up is complete, the sequence microcomputer 100 confirms that the time TA (the time obtained by the above-mentioned first time count) since the command J_Start to actuate the shake detection unit 201 was sent to the interchangeable lens 20 is longer than the time T1 until the operation of the shake detection unit 201 stabilizes. Just as in the first embodiment above, if T1>TA and/or T2>TB, it is determined that an image has been captured in a state in which the operation of the shake detection unit 201 and/or the operation of the image blur correction device 210 has not stabilized, and the captured image with the attached warning shown in FIG. 5b is displayed on the image display liquid crystal unit 105. The detection stabilization time T1 is held in a lens information storage unit of the lens microcomputer 200, for example.

Third Embodiment

Figure 10:
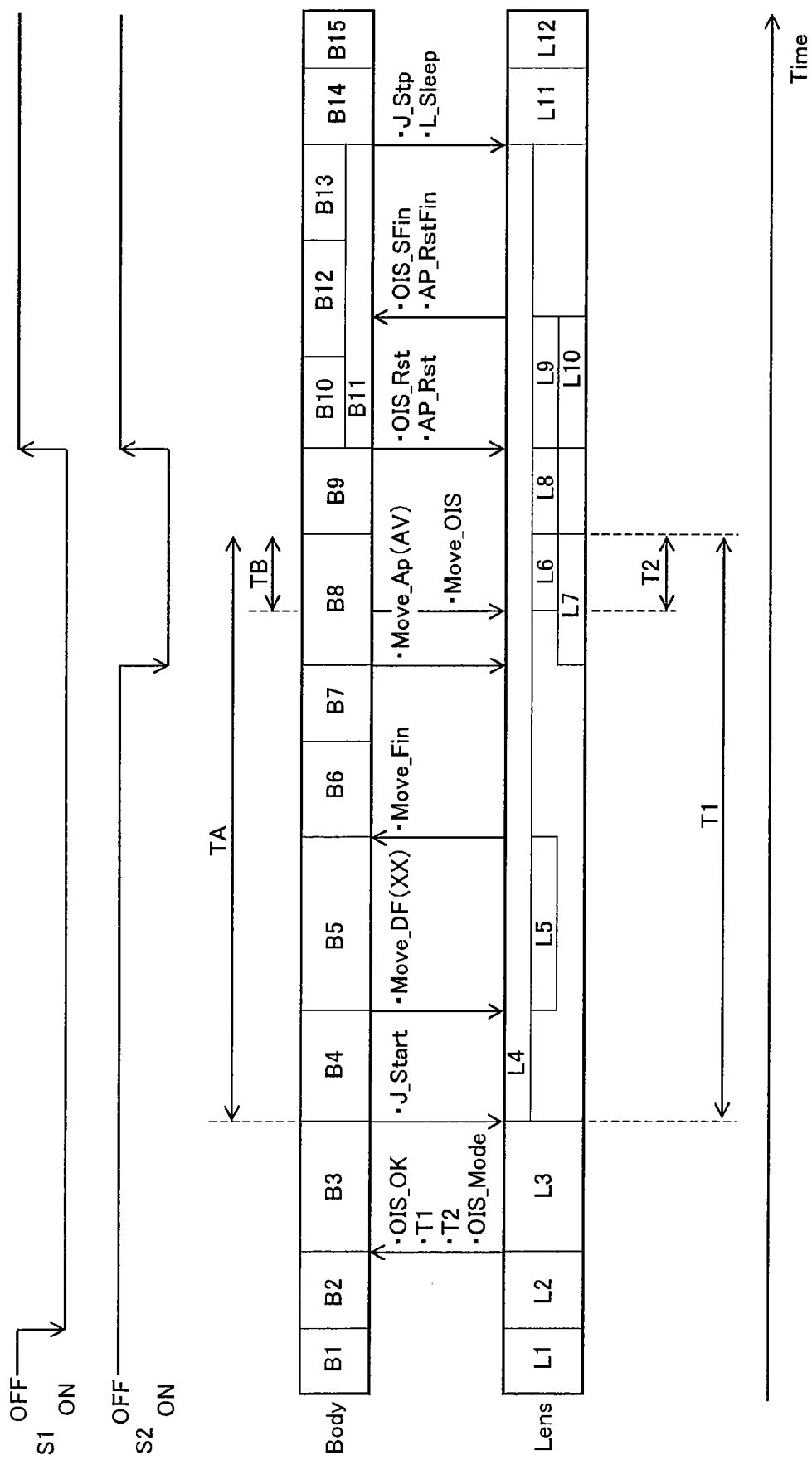
FIG. 10 is a time chart C (a type in which release timing has priority) in a third embodiment of the present invention.

In the above embodiments, the exposure preparation time T3 was utilized in determining the actuation timing of the image blur correction device 210, but it is also possible not to utilize the time T3. The imaging sequence of a camera system according to a third embodiment of the present invention will be described with reference to FIG. 10. FIG. 10 is a time chart C, which is a time chart of the imaging sequence according to the third embodiment of the present invention.

This time chart C differs from the sequences shown in time charts A and B (see FIGS. 4 and 9) in that it is a type of sequence in which the sequence microcomputer 100 commands the lens microcomputer 200 of the interchangeable lens 20 to perform image blur correction without utilizing the exposure preparation time T3. More specifically, in this case, the sequence microcomputer 100 on the camera body 10 side sends a command to the interchangeable lens 20 side to begin image blur correction with a Move_OIS communication so that image blur correction will be performed immediately, before the time T2 of the timing at which exposure is scheduled to begin after mirror-up.

Let us now compare time charts A and C. In the time chart A shown in FIG. 4, the lens microcomputer 200 on the interchangeable lens 20 side controls the actuation of an image blur correction mechanism (the start of excitation drive for image blur correction) on the basis of the excitation drive time T2 for image blur correction.

In contrast, with the time chart C shown in FIG. 10, when the camera system 1 is actuated, the excitation drive time T2 for image blur correction is sent ahead of time from the interchangeable lens 20 side to the camera body 10 side. The sequence microcomputer 100 on the camera body 10 side then determines the actuation timing of the image blur correction device 210 (the timing at which the excitation drive for image blur correction will begin) on the basis of the exposure preparation time T3 and the excitation drive time T2 for image blur correction.

Also, with the time chart A shown in FIG. 4, the actuation of the image blur correction mechanism is controlled by the lens microcomputer 200. In this case, it is possible to utilize an external interrupt together with the actuation timing of the image blur correction mechanism, so that the excitation drive for image blur correction is controlled at the optimal timing without taking into account the processing lag of the lens microcomputer 200 or the processing lag produced by communication between the camera body 10 and the interchangeable lens 20 as extra time, for example. Also, an advantage to a method utilizing T3 as shown in FIG. 4, for example, is that communication is possible at the mirror-up timing even with a release sequence in which mirror-up is performed a few seconds before exposure in order to avoid shock during mirror-up. Also, when the image blur correction mode is set to MODE 1, the configuration may be such that the Move_OIS communication (Move_OIS (T3)) is sent simultaneously with the J_Start communication.

In contrast, with the time chart C shown in FIG. 10, the actuation of the image blur correction mechanism is controlled by the sequence microcomputer 100. In this case, it is necessary to issue a command to begin excitation drive for image blur correction while taking into account the processing lag of the sequence microcomputer 100 and the lens microcomputer 200 or the processing lag produced by communication between the camera body 10 and the interchangeable lens 20 as extra time, for example. On the other hand, the lens microcomputer 200 on the interchangeable lens 20 side does not need to perform time management. An advantage is therefore that the processing can be simplified on the interchangeable lens 20 side.

Fourth Embodiment

Figure 11:
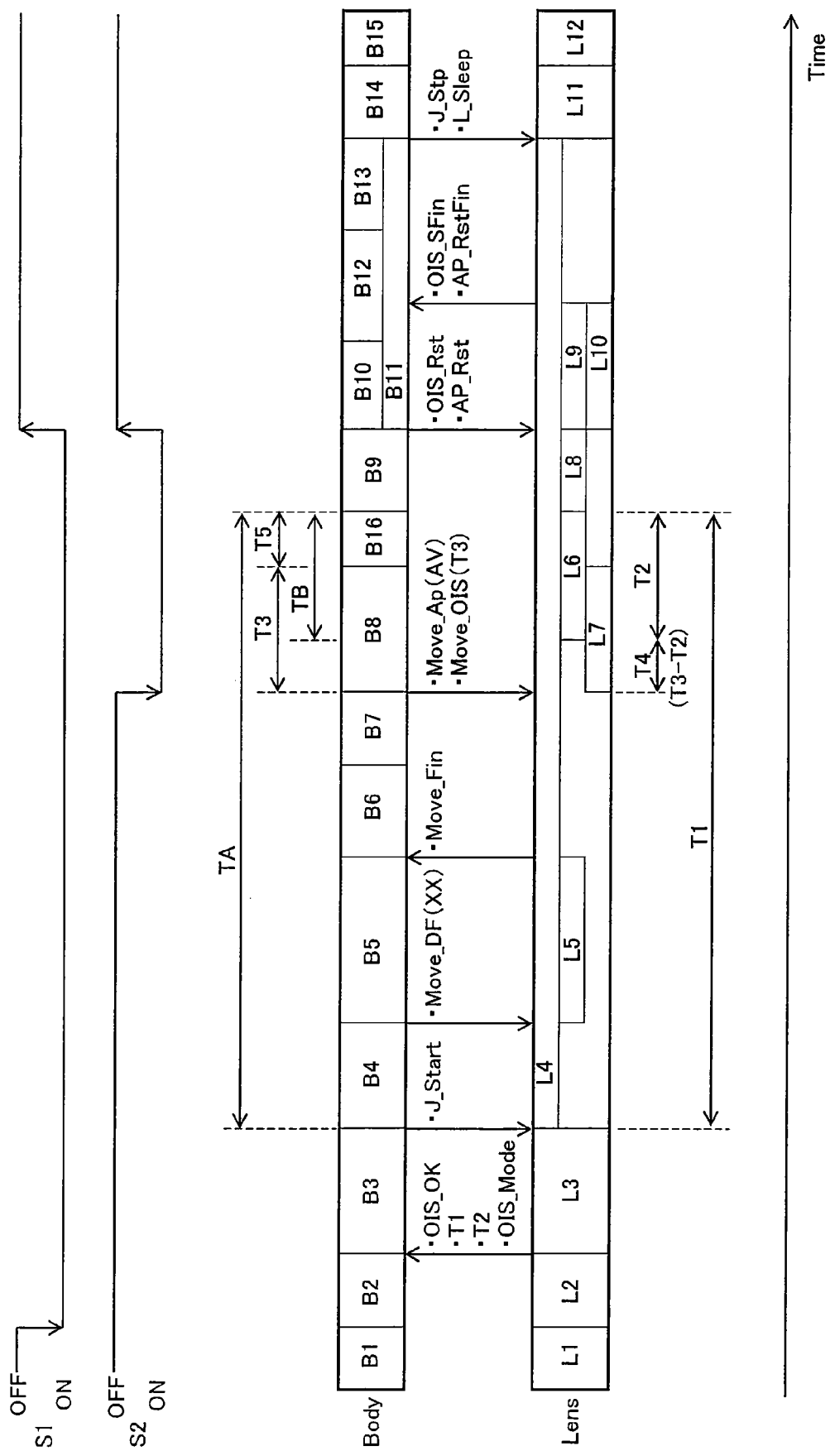
FIG. 11 is a time chart D (a type in which image blur correction has priority) in a fourth embodiment of the present invention.

The time charts A to C according to the above embodiments all give priority to release timing rather than to the stability of the operation of image blur correction. That is, in the first to third embodiments described above, if T3<T2, there is a lag in the timing at which the image blur correction operation stabilizes from the start of exposure by the time (T2−T3). However, a situation is also possible in which the stability of the image blur correction effect is given priority, and exposure is started after first waiting for the image blur correction operation to stabilize. This is an effective method in imaging when the release timing is not given that much importance. Here, the description will be given of a case of employing an image blur correction priority mode (an imaging mode in which the stability of the operation of the mechanism used for image blur correction is ensured preferentially over release timing), as opposed to the above-mentioned mode in which release timing is given priority. FIG. 11 is a time chart D, which is an imaging sequence time chart according to the fourth embodiment of the present invention.

Imaging Control in which Image Blur Correction is Given Priority

FIG. 11 shows the configuration of a time chart D that can be applied to this embodiment. This time chart D differs from the time chart A shown in FIG. 4 in that the system is on standby after mirror-up until TA>T1 and TB>T3 (standby B16: standby time T5), after which exposure is begun. Thus, the reliable functioning of image blur correction is ensured by providing the standby time T5. Accordingly, this time chart D is particularly effective when T3<T2. Other than the standby time T5, everything is the same as in the time chart A shown in FIG. 4. Furthermore, the time chart D in FIG. 11 shows a case in which T3>T2 in the first embodiment described above.

Figure 15:
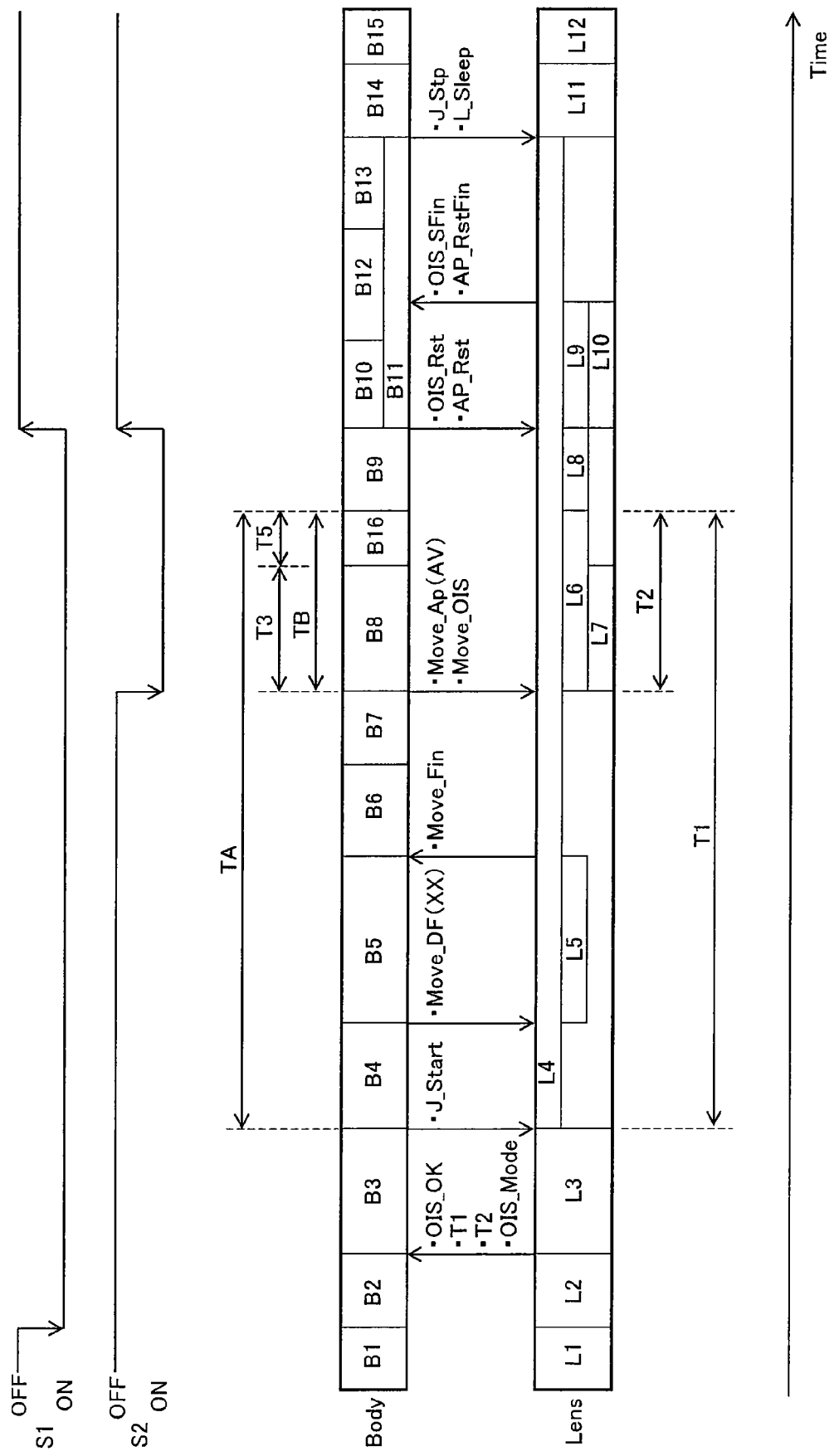
FIG. 15 is a modification example of the time chart D in the fourth embodiment of the present invention.

As shown in FIG. 15, when T3≦T2, the image blur correction device 210 is actuated simultaneously with the receipt of the image blur correction drive command "Move_OIS" by the lens microcomputer 200, and when T3<T2 (T4<0), the standby time T5=T2−T3. At this point, as described above, the time TB may be counted, and if the times T3 and T2 are already known, the standby time T5 may be found in advance.

Figure 12:
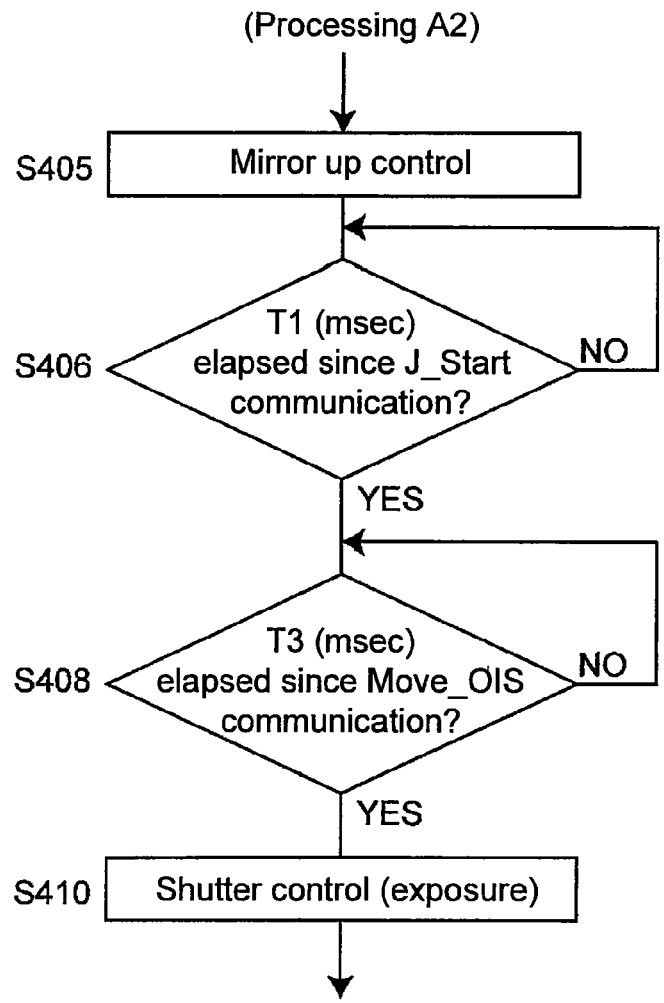
FIG. 12 is part of a flowchart of the time chart D in the fourth embodiment of the present invention.
Figure 13:
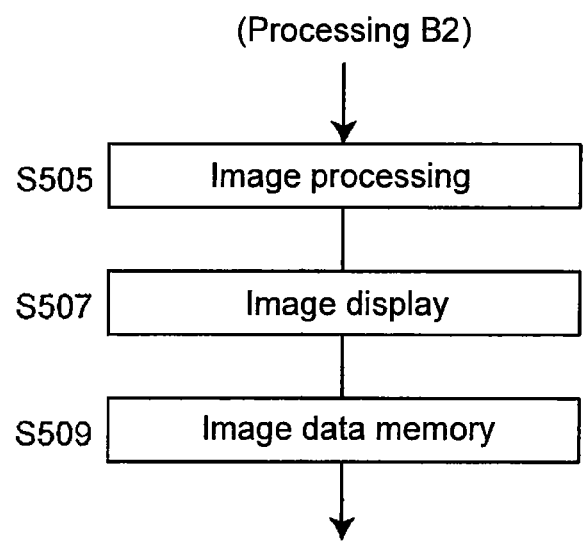
FIG. 13 is part of a flowchart of the time chart D in the fourth embodiment of the present invention.

The above-mentioned time chart D will also be described with reference to the flowcharts shown in FIGS. 12 and 13. FIGS. 12 and 13 show portions of the flowchart of the time chart D according to the fourth embodiment of the present invention (see FIG. 11). Out of the plurality of steps in the flowcharts shown in FIGS. 6, 7, and 8, a flowchart of the sequence expressed by the time chart D is given by replacing the processing from the mirror-up control processing (step S205) to the shutter control (exposure) processing (step S210) (processing A) and the processing from the image processing (step S305) to the image data memory processing (step S309) (processing B) with the processing A2 and the processing B2 shown in FIGS. 12 and 13. The flowchart of the time chart D is the same as the above-mentioned flowcharts except for the processing A2 and processing B2 shown in FIGS. 12 and 13. Here, the steps in FIGS. 12 and 13 will be described.

Referring to FIGS. 12 and 13, after mirror-up control (step S405), there are included a wait loop of at least the time T1 from the J_Start communication (step S406), and a wait loop of at least the time T3 from the Move_OIS communication (step S408). Introducing these wait loops allows a stable image blur correction effect to be ensured more reliably. Furthermore, there is no need for a warning display in the display of the image as in the embodiments given above. Therefore, the only image display that is needed is the ordinary image display shown in FIG. 5a.

Other Embodiments

The specific constitution of the present invention is not limited to the embodiments given above, and various modifications and revisions are possible without departing from the gist of the invention.

(1)

The embodiments given above were premised on the excitation drive time T2 for image blur correction being constant. However, the excitation drive time T2 for image blur correction may vary with the state of the interchangeable lens 20 (for example, the zoom position, temperature, or humidity). In view of this, the sequence microcomputer 100 of the camera body 10 is preferably made up of such that data such as T2 with the potential to vary is updated at specific intervals or at a specific timing, not only at the time of actuation. When the camera body 10 is made up in this way, T2 may be updated after the Move_OIS (T3) communication is performed, so the relationship T3>T2 may not be satisfied. If this happens, some suitable processing may be performed, such as setting up an image blur error flag, to alert the user.

(2)

In the embodiments given above, the single-reflex camera system 1 composed of the camera body 10 and the interchangeable lens 20 was described as an example, but the present invention is not limited to being applied to a single-reflex camera system. The present invention can be applied to any camera system having a camera body and an interchangeable lens that can be attached to and detached from this camera body.

(3)

How the camera body and the interchangeable lens exchange information is not limited to the methods described above. For instance, the communication method may be either serial or parallel communication, or may be a communication method based on a standard, or a multipurpose communication method, or a dedicated communication method developed independently.

(4)

Figure 16:
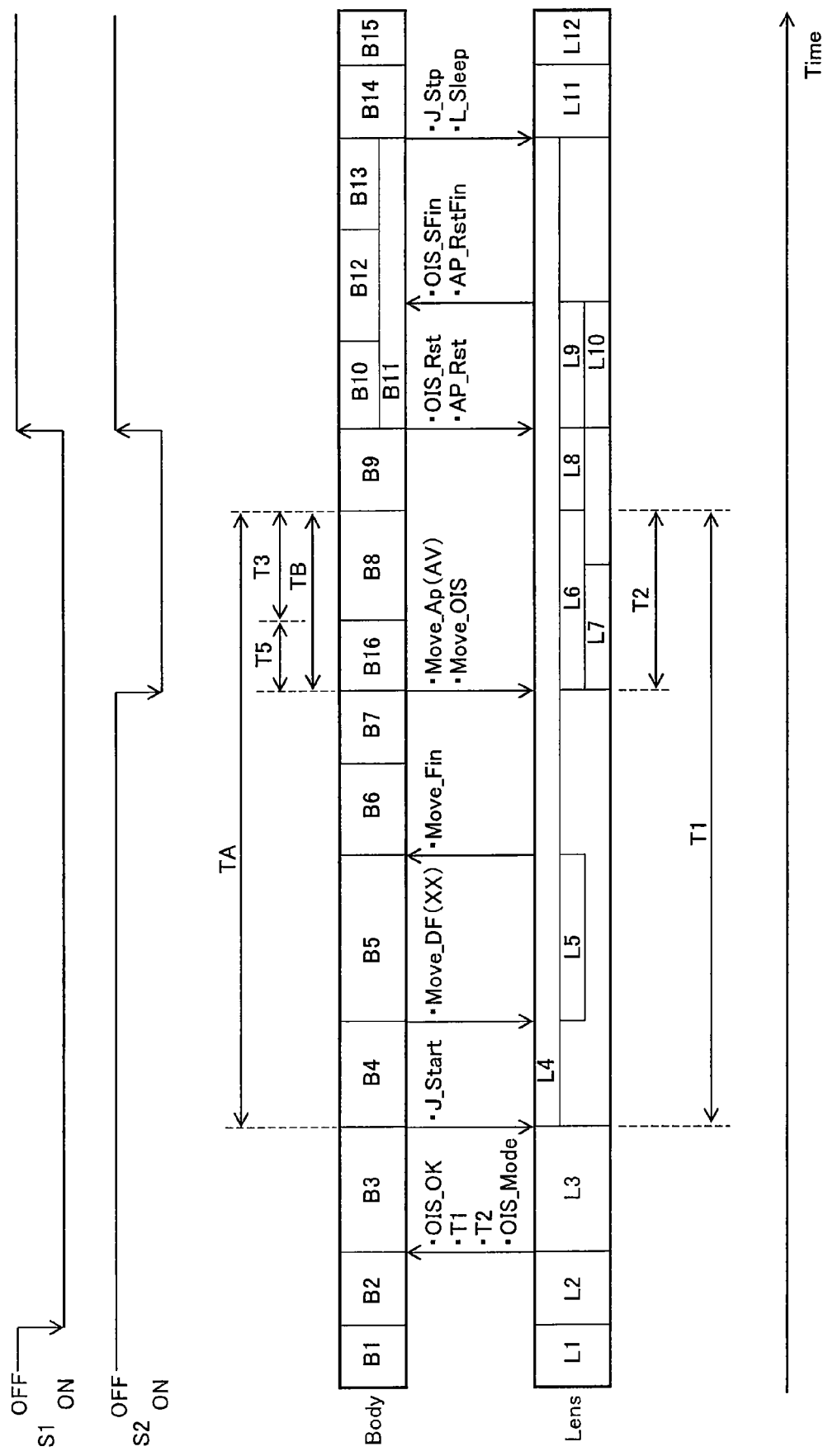
FIG. 16 is a time chart in another embodiment of the present invention.

With the fourth embodiment given above, the standby time T5 from the completion of exposure preparation until the start of exposure was ensured, but the standby time T5 may instead be ensured from after the image blur correction actuation command is sent until the start of exposure preparation. More specifically, the time chart may be the one shown in FIG. 16. Here again the same effect as that in the above-mentioned fourth embodiment will be obtained.

INDUSTRIAL APPLICABILITY

The present invention is favorable for a camera system in which an interchangeable lens can be attached to or detached from a camera body, typified by a digital single-reflex camera.

The invention claimed is:

1. A camera system for imaging a subject, the camera system comprising:
a camera body including an imaging unit for imaging the subject, and a body control unit for controlling the imaging action of the imaging unit; and
an interchangeable lens including a shake detection unit for detecting shake of the camera system, an image blur correction unit for adjusting the optical path from the subject to the camera body and thereby correcting the blurring of an image caused by shaking of the camera system, and a lens control unit for controlling the correction action of the image blur correction unit according to the amount of shake detected by the shake detection unit,
wherein the body control unit is capable of sending and receiving information to and from the lens control unit, and stores body information related to the camera body,
the lens control unit stores lens information related to the image blur correction unit,
one of the body control unit and the lens control unit determines one of timings including correction timing at which the image blur correction unit starts the correction action, exposure timing at which the imaging unit starts exposure, and exposure preparation timing at which the imaging unit starts exposure preparation, based on the body information and the lens information,
the body information includes an exposure preparation time required from the point when the camera body begins exposure preparation until the exposure preparation is completed, the lens information includes a correction stabilization time required from the point when the image blur correction unit is actuated until a specific image blur correction effect is obtained, and one of the body control unit and the lens control unit determines one of the correction timing, the exposure timing, and the exposure preparation timing, based on the exposure preparation time and the correction stabilization time.

2. The camera system according to claim 1,
wherein if the correction stabilization time is shorter than the exposure preparation time, the lens control unit calculates a predetermined time by subtracting the correction stabilization time from the exposure preparation time, and starts the correction action in the image blur correction unit after the predetermined time has elapsed since the receipt of a command for actuating the image blur correction unit from the body control unit.

3. The camera system according to claim 1,
wherein if the correction stabilization time is shorter than the exposure preparation time, the body control unit calculates a predetermined time by subtracting the correction stabilization time from the exposure preparation time, and sends a command for actuating the image blur correction unit to the lens control unit after the predetermined time has elapsed since the imaging unit began exposure preparation.

4. The camera system according to claim 1,
wherein if the correction stabilization time is longer than the exposure preparation time, the body control unit calculates a predetermined time by subtracting the exposure preparation time from the correction stabilization time, and starts exposure in the imaging unit after the predetermined time has elapsed since exposure preparation is completed in the imaging unit.

5. The camera system according to claim 1,
wherein if the correction stabilization time is longer than the exposure preparation time, the body control unit calculates a predetermined time by subtracting the exposure preparation time from the correction stabilization time, and starts exposure preparation in the imaging unit after the predetermined time has elapsed since a command for actuating the image blur correction unit is sent to the lens control unit.

6. The camera system according to claim 1,
wherein the camera body includes an information display unit for displaying the body information, and
the body control unit includes a first time counting unit for performing a time count from the point when a command for actuating the image blur correction unit is sent to the lens control unit until the exposure of the imaging unit is begun, and a warning unit for displaying a warning on the information display unit if the time count in the first time count unit exceeded the exposure preparation time.

7. The camera system according to claim 1,
wherein the camera body includes an information display unit for displaying the body information, and
the body control unit includes a second time counting unit for performing a time count from the point when a command for actuating the shake detection unit, to start the detecting of shake in the camera system via the shake detection unit, is sent to the lens control unit until the exposure of the imaging unit is begun, and a warning unit for displaying a warning on the information display unit if the time count in the second time count unit exceeded the exposure preparation time.

8. An interchangeable lens used in a camera system with a camera body including a body control unit, the interchangeable lens comprising:

a shake detection unit for detecting shake of the camera system;

an image blur correction unit for adjusting the optical path from a subject to the camera body and thereby correcting the blurring of an image caused by shaking of the camera system; and a lens control unit capable of sending and receiving information to and from the body control unit, and for controlling the drive of the image blur correction unit according to the amount of shake detected by the shake detection unit, wherein the lens control unit stores lens information related to the image blur correction unit, and determines correction timing at which the image blur correction unit starts a correction action, based on the lens information and body information stored in the body control unit and related to the camera body, the body information includes the exposure preparation time required from the point when the camera body begins exposure preparation until the exposure preparation is completed, the lens information includes the correction stabilization time required from the point when the image blur correction unit is actuated until a specific image blur correction effect is obtained, and the lens control unit determines the correction timing based on the exposure preparation time and the correction stabilization time.

9. The interchangeable lens according to claim 8,
wherein if the correction stabilization time is shorter than the exposure preparation time, the lens control unit calculates a predetermined time by subtracting the correction stabilization time from the exposure preparation time, and starts the correction action in the image blur correction unit after the predetermined time has elapsed since the receipt of a command for actuating the image blur correction unit from the body control unit.

10. A camera body used in a camera system with an interchangeable lens including a shake detection unit for detecting shake in the camera system, an image blur correction unit for adjusting the optical path from a subject to the camera body and thereby correcting the blurring of an image caused by shaking of the camera system, and a lens control unit for controlling the drive of the image blur correction unit according to the amount of shake detected by the shake detection unit, the camera body comprising:

an imaging unit for imaging a subject through the interchangeable lens; and a body control unit capable of sending and receiving information to and from the lens control unit, and for controlling the imaging action of the imaging unit, wherein the body control unit stores body information related to the camera body, and determines one of timings including correction timing at which the image blur correction unit starts the correction action, exposure timing at which the imaging unit starts exposure, and exposure preparation timing at which the imaging unit starts exposure preparation, based on the body information and lens information stored in the lens control unit and related to the image blur correction unit, the body information includes an exposure preparation time required from the point when the camera body begins exposure preparation until the exposure preparation is completed, the lens information includes a correction stabilization time required from the point when the image blur correction unit is actuated until a specific image blur correction effect is obtained, and the body control unit determines one of timings including the correction timing at which the image blur correction unit starts the correction action, the exposure timing at which the imaging unit starts exposure, and the exposure preparation timing at which the imaging unit starts exposure preparation.

11. The camera body according to claim 10,
wherein if the correction stabilization time is shorter than the exposure preparation time, the body control unit calculates a predetermined time by subtracting the correction stabilization time from the exposure preparation time, and sends a command for actuating the image blur correction unit to the lens control unit after the predetermined time has elapsed since the imaging unit started the exposure preparation.

12. The camera body according to claim 10,
wherein if the correction stabilization time is longer than the exposure preparation time, the body control unit calculates a predetermined time by subtracting the exposure preparation time from the correction stabilization time, and starts exposure in the imaging unit after the predetermined time has elapsed since exposure preparation is completed in the imaging unit.

13. The camera body according to claim 10,
wherein if the correction stabilization time is longer than the exposure preparation time, the body control unit calculates a predetermined time by subtracting the exposure preparation time from the correction stabilization time, and starts exposure preparation in the imaging unit after the predetermined time has elapsed since a command for actuating the image blur correction unit is sent to the lens control unit.

14. A method for controlling a camera system including a camera body having a body control unit for controlling the imaging action of an imaging unit, and an interchangeable lens having a lens control unit capable of sending and receiving information to and from the body control unit and for controlling the drive of an image blur correction unit according to the shake detected by a shake detection unit, the method for controlling the camera system comprising:

determining one of timings including correction timing at which the image blur correction unit starts the correction action, exposure timing at which the imaging unit starts exposure, and exposure preparation timing at which the imaging unit starts exposure preparation by one of the body control unit and the lens control unit, based on body information related to the camera body and lens information related to the image blur correction unit;

performing the correction action at the image blur correction unit;

preparing exposure at the imaging unit; and performing exposure at the imaging unit, after completing the exposure preparation at the imaging unit, wherein one of the correction action, exposure preparation, and exposure is started at the timing determined by one of the body control unit and the lens control unit, the body information includes an exposure preparation time required from the point when the camera body begins exposure preparation until the exposure preparation is completed, the lens information includes a correction stabilization time required from the point when the image blur correction unit is actuated until a specific image blur correction effect is obtained, and one of the body control unit and the lens control unit determines one of the timings including the correction timing, the exposure timing, and the exposure preparation timing, based on the exposure preparation time and the correction stabilization time.

* * * * *